(12) United States Patent
Deguchi

(10) Patent No.: US 7,103,516 B2
(45) Date of Patent: Sep. 5, 2006

(54) APPARATUS AND METHOD FOR OPTIMIZING THREE-DIMENSIONAL MODEL

(75) Inventor: Masahira Deguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 602 days.

(21) Appl. No.: 09/731,799

(22) Filed: Dec. 8, 2000

(65) Prior Publication Data
US 2001/0000963 A1 May 10, 2001

Related U.S. Application Data

(63) Continuation of application No. PCT/JP99/00338, filed on Jan. 27, 1999.

(30) Foreign Application Priority Data
Jul. 14, 1998 (JP) ................................. 10-198453

(51) Int. Cl.
G06F 7/60 (2006.01)
G06T 15/00 (2006.01)
G06K 9/46 (2006.01)
G06F 7/00 (2006.01)

(52) U.S. Cl. ........................... 703/2; 345/419; 382/190
(58) Field of Classification Search ................ 348/150; 345/866, 435, 427, 419; 382/284, 190; 703/6, 2; 706/19; 395/763, 119
See application file for complete search history.

(56) References Cited

U.S. PATENT DOCUMENTS

| | | | | |
|---|---|---|---|---|
| 5,448,652 A * | 9/1995 | Vaidyanathan et al. | ..... | 382/165 |
| 5,448,696 A * | 9/1995 | Shimada et al. | ............ | 715/853 |
| 5,452,238 A * | 9/1995 | Kramer et al. | ................. | 703/1 |
| 5,475,799 A * | 12/1995 | Yoshioka et al. | ........... | 345/420 |
| 5,506,947 A * | 4/1996 | Taubin | ........................ | 345/441 |
| 5,617,520 A * | 4/1997 | Yamada et al. | ............. | 345/419 |
| 5,694,484 A * | 12/1997 | Cottrell et al. | .............. | 382/167 |
| 5,740,341 A * | 4/1998 | Oota et al. | ................... | 395/120 |
| 5,742,288 A * | 4/1998 | Nishizaka et al. | .......... | 345/418 |
| 5,754,738 A * | 5/1998 | Saucedo et al. | .............. | 706/11 |
| 5,764,814 A * | 6/1998 | Chen et al. | ................. | 382/243 |
| 5,793,373 A * | 8/1998 | Sekine et al. | ............... | 345/420 |
| 5,806,521 A * | 9/1998 | Morimoto et al. | ..... | 128/661.01 |
| 5,808,616 A * | 9/1998 | Shimizu | ..................... | 345/419 |
| 5,894,310 A * | 4/1999 | Arsenault et al. | ........... | 345/443 |
| 5,970,490 A * | 10/1999 | Morgenstern | ................. | 707/10 |
| 5,982,951 A * | 11/1999 | Katayama et al. | .......... | 382/284 |
| 6,020,972 A * | 2/2000 | Mahoney et al. | .......... | 358/1.14 |
| 6,058,209 A * | 5/2000 | Vaidyanathan et al. | ..... | 382/203 |
| 6,208,347 B1 * | 3/2001 | Migdal et al. | .............. | 345/419 |

(Continued)

FOREIGN PATENT DOCUMENTS

JP    A-3-194656    *  8/1991

(Continued)

OTHER PUBLICATIONS

Qiang-J et al., Machine Interpretation of CAD Data for Manufacturing Applications (1997), ACM Computing Surveys, vol. 24, No. 3, Sep. 1997.*

(Continued)

Primary Examiner—Paul L. Rodriguez
Assistant Examiner—Tom Stevens
(74) Attorney, Agent, or Firm—Staas & Halsey LLP

(57) ABSTRACT

A model optimization apparatus detects redundant shapes, such as two shapes offsetting each other, pattern shapes, etc. in editing data of a plurality of shapes forming a three-dimensional model, deletes the data of the redundant shapes, and releases and reconstructs the relationship between shapes, thereby optimizing the data structure.

16 Claims, 27 Drawing Sheets

U.S. PATENT DOCUMENTS

| | | | |
|---|---|---|---|
| 6,285,372 B1 * | 9/2001 | Cowsar et al. | 345/425 |
| 6,583,813 B1 * | 6/2003 | Enright et al. | 348/150 |
| 6,593,938 B1 * | 7/2003 | Sakata et al. | 345/629 |
| 6,819,782 B1 * | 11/2004 | Imagawa et al. | 382/115 |
| 2003/0187625 A1 * | 10/2003 | Deguchi | 703/6 |

FOREIGN PATENT DOCUMENTS

| | | | |
|---|---|---|---|
| JP | A-6-60153 | | 3/1994 |
| JP | A-6-60153 | * | 4/1994 |
| JP | A-7-49967 | * | 2/1995 |
| JP | A-7-73341 | * | 3/1995 |
| JP | A-7-200873 | * | 8/1995 |
| JP | A-8-335279 | * | 12/1996 |
| JP | A-9-282486 | * | 10/1997 |

OTHER PUBLICATIONS

Shih-C, A Design/Constraint Model to Capture Design Intent, ACM 0-8979-946 1997 (p. 225-264).*

Japanese Patent Office, "Notification of the Ground of Claim Rejection", pp. 1-3, Jun. 4, 2002.*

Yoshiyuki Kawai, et al., "Effective Patches Generation Method for Expression of Polyhedron" from "Research Reports of Information Processing Society", 97-CG-86 (Aug. 21 and 22, 1997), pp. 11-16, IPSJ.

Japanese Patent Office, JP-A-9-282486, Abstract, 1 page, Oct. 31, 1997.

* cited by examiner

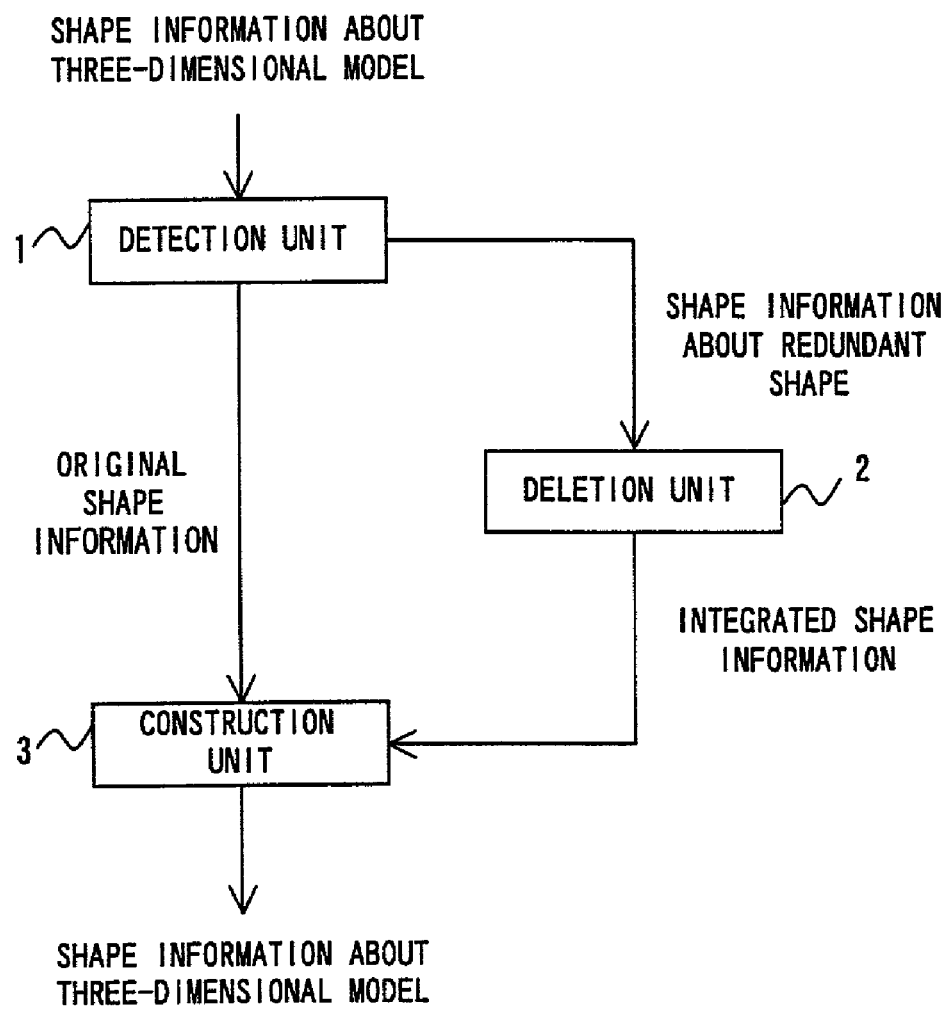
F I G. 1

| ATTRIB-UTE NUMBER | VERTEX COORDINATES |
| --- | --- |
| | ARRANGEMENT POSITION |
| | DEFINITION INFORMATION |

FIG. 5

| NUMBER | ITEM | DATA |
|---|---|---|
| 1 | VERTEX COORDINATES | {(0,0,0), (200,0,0), (200,100,0), (0,100,0)} (0,0,10), (200,0,10), (200,100,10), (0,100,10) |
| | ARRANGEMENT POSITION | — |
| | DEFINITION INFORMATION | PROJECTION, PROJECTION, h=10 |
| 2 | VERTEX COORDINATES | {(25,25,10), (75,25,10), (75,75,10), (25,75,10)} (25,25,0), (75,25,0), (75,75,0), (25,75,0) |
| | ARRANGEMENT POSITION | 1:F1, 1:E1-25, 1:E2-25 |
| | DEFINITION INFORMATION | CUT, PROJECTION, h=-10 |
| 3 | VERTEX COORDINATES | {(12.5,12.5,10)10} (12.5,12.5,40), {(87.5,12.5,10)10} (87.5,12.5,40), {(87.5,87.5,10)10} (87.5,87.5,40), {(12.5,87.5,10)10} (12.5,87.5,40) |
| | ARRANGEMENT POSITION | 1:F1, 2:E1-12.5, 2:E2-12.5 |
| | DEFINITION INFORMATION | PROJECTION, PROJECTION, h=30 |
| 4 | VERTEX COORDINATES | {(25,25,10), (75,25,10), (75,75,10), (25,75,10)} (25,25,0), (75,25,0), (75,75,0), (25,75,0) |
| | ARRANGEMENT POSITION | 1:F2, 1:E5-25, 1:E6-25 |
| | DEFINITION INFORMATION | PROJECTION, PROJECTION, h=10 |
| 5 | VERTEX COORDINATES | {(125,25,10), (175,25,10), (175,75,10), (125,75,10)} (125,25,5), (175,25,5), (175,75,5), (125,75,5) |
| | ARRANGEMENT POSITION | 1:F1, 1:E1-125, 1:E2-25 |
| | DEFINITION INFORMATION | CUT, PROJECTION, h=-5 |
| 6 | VERTEX COORDINATES | {(135,35,5), (165,35,5), (165,65,5), (135,65,5)} (135,35,10), (165,35,10), (165,65,10), (135,65,10) |
| | ARRANGEMENT POSITION | 5:F1, 1:E1-10, 1:E2-10 |
| | DEFINITION INFORMATION | PROJECTION, PROJECTION, h=5 |

FIG. 15

| NUMBER | ITEM | DATA |
|---|---|---|
| 2 | VERTEX COORDINATES | {(25, 25, 10), (75, 25, 10), (75, 75, 10), (25, 75, 10)} (25, 25, 0), (75, 25, 0), (75, 75, 0), (25, 75, 0) |
| | ARRANGEMENT POSITION | 1:F1, 1:E1-25, 1:E2-25 |
| | DEFINITION INFORMATION | CUT, PROJECTION, h=-10 |
| 4 | VERTEX COORDINATES | {(25, 25, 10), (75, 25, 10), (75, 75, 10), (25, 75, 10)} (25, 25, 0), (75, 25, 0), (75, 75, 0), (25, 75, 0) |
| | ARRANGEMENT POSITION | 1:F2, 1:E5-25, 1:E6-25 |
| | DEFINITION INFORMATION | PROJECTION, PROJECTION, h=10 |
| 6 | VERTEX COORDINATES | {(135, 35, 5), (165, 35, 5), (165, 65, 5), (135, 65, 5)} (135, 35, 10), (165, 35, 10), (165, 65, 10), (135, 65, 10) |
| | ARRANGEMENT POSITION | 5:F1, 1:E1-10, 1:E2-10 |
| | DEFINITION INFORMATION | PROJECTION, PROJECTION, h=5 |

FIG. 16

| NUMBER | ITEM | DATA |
|---|---|---|
| 5 | ADDITIONAL VERTEX | [(135, 35, 5), (165, 35, 5), (165, 65, 5), (135, 65, 5)] (135, 35, 10), (165, 35, 10), (165, 65, 10), (135, 65, 10) |

F I G. 17

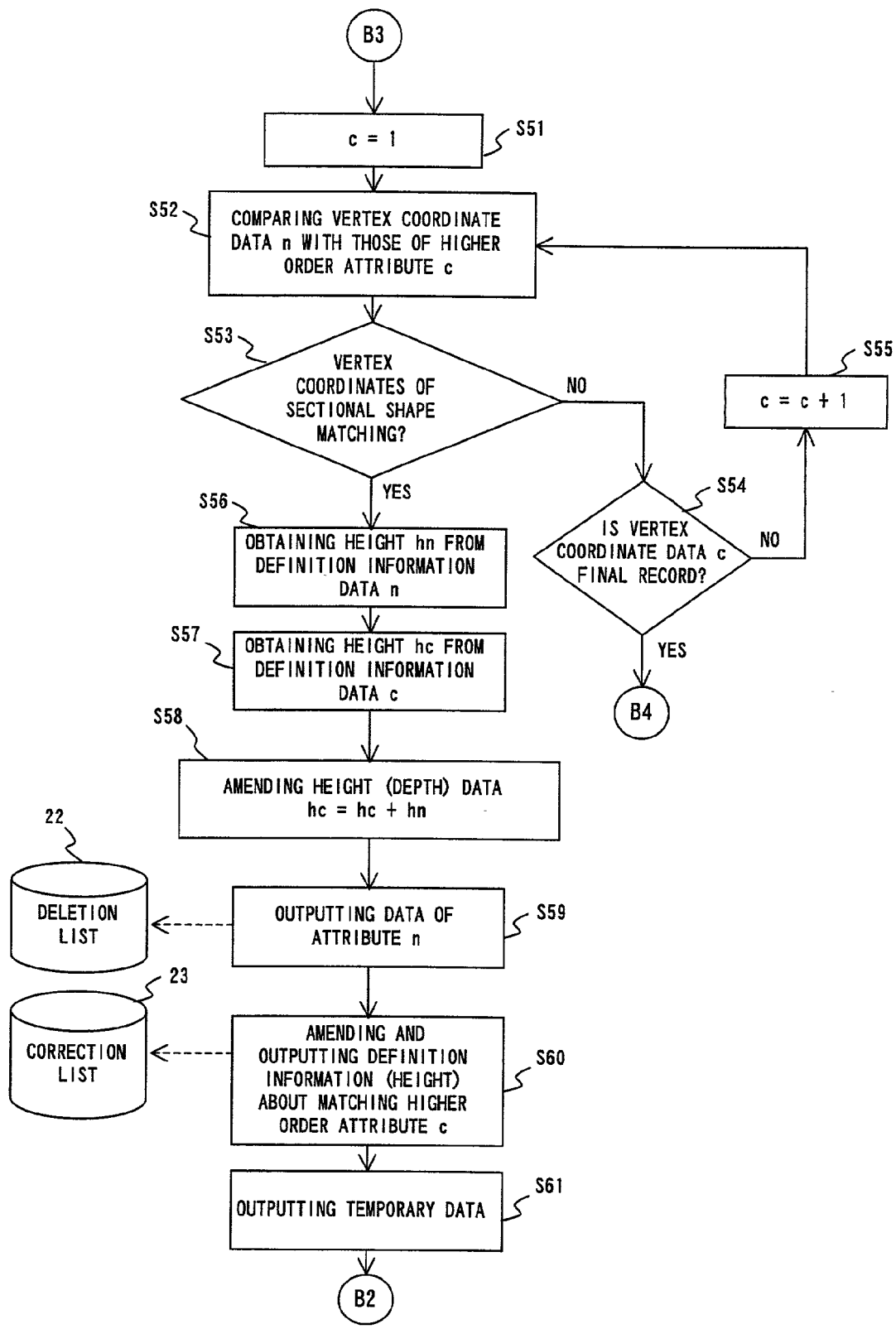
F I G. 20

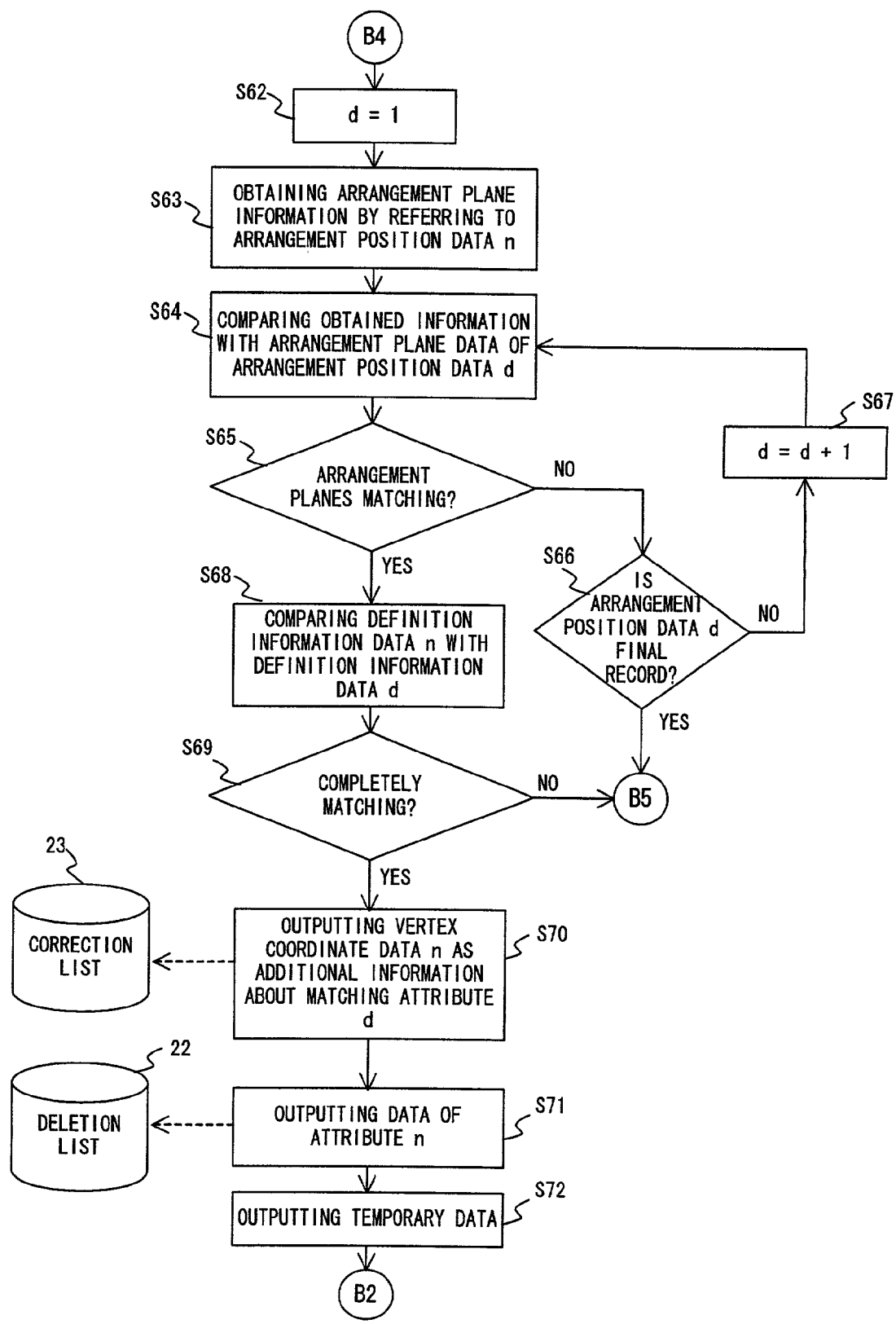
F I G. 21

| NUMBER | ITEM | DATA |
|---|---|---|
| 1 | VERTEX COORDINATES | {(0, 0, 0), (200, 0, 0), (200, 100, 0), (0, 100, 0)} {(0, 0, 10), (200, 0, 10), (200, 100, 10), (0, 100, 10)} |
|   | ARRANGEMENT POSITION | — |
|   | DEFINITION INFORMATION | PROJECTION, PROJECTION, h=10 |
| 2 | VERTEX COORDINATES | {(12.5, 12.5, 10)10} {(12.5, 12.5, 40), {(87.5, 12.5, 40), {(87.5, 87.5, 12.5, 40), {(87.5, 87.5, 10)10} (87.5, 87.5, 10)10} (12.5, 87.5, 10)10} (12.5, 87.5, 40) |
|   | ARRANGEMENT POSITION | 1:F1, 1:E1-12.5, 1:E2-12.5 |
|   | DEFINITION INFORMATION | PROJECTION, PROJECTION, h=30 |
| 3 | VERTEX COORDINATES | {(125, 25, 10), (175, 25, 10), (125, 75, 10)} {(125, 25, 5), (175, 25, 5), (175, 75, 5), (125, 75, 5)} |
|   | ARRANGEMENT POSITION | 1:F1, 1:E1-125, 1:E2-25 |
|   | DEFINITION INFORMATION | CUT, PROJECTION, h=-5 |

FIG. 23

| NUMBER | ITEM | DATA |
|---|---|---|
| 2 | VERTEX COORDINATES | {(25, 25, 10), (75, 25, 10), (75, 75, 10), (25, 75, 10)} |
| | ARRANGEMENT POSITION | 1:F1, 1:E1-25, 1:E2-25 |
| | DEFINITION INFORMATION | — |

F I G. 2 5

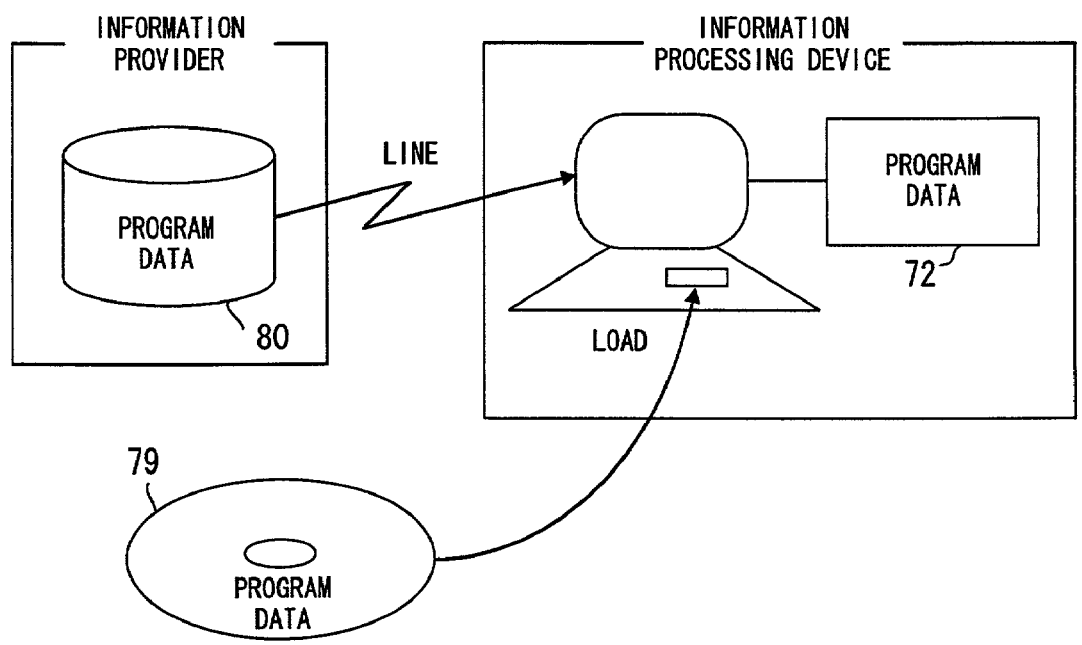
F I G. 27

APPARATUS AND METHOD FOR OPTIMIZING THREE-DIMENSIONAL MODEL

CROSS REFERENCE TO RELATED APPLICATION

This application is a continuation of International PCT Application No. PCT/JP99/00338 filed on Jan. 27, 1999.

BACKGROUND OF THE INVENTION

1. Field of the Invention

The present invention relates to an apparatus and method for optimizing a model for automatically optimizing the data structure of a model without damaging the final shape (outline) of the model in a computer system for processing a three-dimensional model such as a solid model, etc.

2. Description of the Related Art

In a production designing job using a three-dimensional CAD (computer-aided design) system, it is almost impossible that a target specification can be attained in one designing process. Normally, the designing process can be completed after a number of amendments to design results. In the designing process, the designer only has to make the final shape apply to the specification. Therefore, the designer is not specifically aware of the data structure (model structure) of a three-dimensional model. However, the model structure largely depends on the designing process, and intends to be more complicated with an increasing number of amendments to the design.

As a model for representing the three-dimensional shape of an object can be, for example, a wire frame model represented by vertexes and edges; a surface model represented by the surface shape of an object; a solid model representing the definite discrimination between the outer portion and the inner portion of an object, etc. As for a solid model, the complicated outline of an object can be represented by combining the basic shapes (primitives) of a three-dimensional object such as a cuboid, a square hole, etc. In this explanation, the basic shapes are referred to as attributes.

For example, assume that the attribute A, which has become unnecessary during the designing process, has occurred. At this time, if there are other attributes B, C, . . . , which refer to the attribute A, then the attribute A cannot be singly deleted or amended. That is, when the attribute A is deleted or amended, the other attributes B, C, . . . should be correspondingly deleted and amended. Normally, each of the attributes of a solid model is defined using a previously defined attribute as a reference attribute.

When the designer specifies an amendment, the data structure is redefined or amended for each attribute. At this time, if there are only a few attributes relevant to a target attribute, there will not arise a big problem.

However, if an attribute defined at an early stage is to be deleted in a solid model containing hundreds or thousands of attributes, then a fatal problem may arise. In this case, since most of the attributes defined after the attribute to be deleted are relevant to the attribute, the designer has to manually amend all of the relevant attributes. This requires an enormously long time and intensive work.

In such a case, a target shape may be obtained by adding a new attribute without deleting the target attribute. For example, when the attribute to be deleted represents a hole in the surface of an object, a result equivalent to the deletion of the hole can be obtained by newly defining an object for filling the hole. On the other hand, when the attribute of the object to be deleted represents a boss (projection) in the surface of the object, a result equivalent to the deletion of the boss can be obtained by newly defining a hole having the same shape of the boss.

However, the designing process performed on the conventional solid model has the following problems.

First, a solid model designed by repeating substitute processes for replacing an attribute to be deleted with a new attribute contains a number of redundant attributes which are irrelevant to the actual shape. Therefore, the amount of data becomes enormously large, thereby causing poor responsiveness to each process such as the display, regeneration (reconstruction), amendment, etc. of the shape.

Furthermore, the relationships among the attributes make it difficult to delete or amend only a target attribute, thereby allowing the edition of a solid model only with very poor flexibility. When the solid model is used for a similar design or the analysis of a structure, the third party other than the designer may join the process, thereby causing the problem, in addition to the problem of the above described poor flexibility, that the third party does not understand the structure of the model and the relationships among the attributes of the model. As a result, an enormously long time is required to amend the solid model. In addition, it maybe necessary to newly generate the solid model. This is not an effective use of an existing solid model.

After the solid model has been designed as described above, the structure analysis is applied to the model in the finite element method. In this case, it is necessary to divide the solid model in a mesh format. However, the model may not be successfully divided by the existing automatic mesh division function.

This may be caused by adding an attribute which covers an attribute to be deleted. There is the possibility that a slight difference in shape arises at an edge of the attribute to be deleted even if a new attribute of the same shape is added to fill the attribute to be deleted. There are no problems when the shape is simple or two-dimensional. However, when the shape is complicated or placed on a curved plane, a small unexpected shape may be generated from the problem of computation precision, for example, deletion failure, a difference at the edge, etc. As a result, the mesh division method may result in fail.

In this case, the small unexpected shape should be deleted or amended, thereby requiring an enormously long time and intensive work again. Even if the small unexpected shape is kept as it is, and the mesh dividing process has been successfully performed, the division result contains a large number of small unexpected shapes, and therefore cannot be used for analysis.

SUMMARY OF THE INVENTION

The present invention aims at providing the apparatus and method of optimizing the structure of a three-dimensional model and generating a model having a small amount of data and flexibility in edition.

The model optimization apparatus according to the present invention comprises a detection unit, a deletion unit, and a construction unit. The detection unit detects one or more redundant shapes from a plurality of shapes forming a three-dimensional model of an object. The deletion unit deletes shape information relating to the one or more redundant shapes. The construction unit reconstructs a three-dimensional model of the object according to remaining shape information.

BRIEF DESCRIPTION OF THE DRAWINGS

FIG. 1 shows the principle of the model optimization apparatus according to the present invention;

FIG. 5 shows the structure of solid model data;

FIG. 15 shows the first solid model data;

FIG. 16 is a deletion target list;

FIG. 17 is an amendment target list;

FIG. 20 is a flowchart (3) of a detecting process;

FIG. 21 is a flowchart (4) of a detecting process;

FIG. 23 shows the second solid model data;

FIG. 25 shows the data of the auxiliary curve;

FIG. 27 shows storage media.

DESCRIPTION OF THE PREFERRED EMBODIMENTS

The embodiments of the present invention are described in detail by referring to the attached drawings.

FIG. 1 shows the principle of the model optimization apparatus according to the present invention. The model optimization apparatus shown in FIG. 1 includes a detection unit 1, a deletion unit 2, and a construction unit 3.

The detection unit 1 detects one or more redundant shapes from a plurality of shapes forming a three-dimensional model of an object. The deletion unit 2 deletes the shape information relating to the one or more redundant shapes. The construction unit 3 reconstructs a three-dimensional model of the object according to the remaining shape information.

For example, a three-dimensional model of an object corresponds to a three-dimensional solid model, and the shape of the model corresponds to the above described attributes. One or more redundant shapes contain unnecessary shapes for the three-dimensional model or two or more shapes which can be represented by one shape. The detection unit 1 automatically detects the shapes. The deletion unit 2 deletes the shape information about an unnecessary shape, integrates the shape information about two or more shapes into the shape information about one shape, and automatically deletes the shape information about the three-dimensional model.

The shape information contains, for example, the identification information, the vertex coordinate information, the arrangement position information, the definition information, etc. of each shape contained in a three-dimensional model, and represents the outline, sectional shape, height, position, type (discrimination between the inner and outer portions of an object, etc.) of each shape. The construction unit 3 newly constructs a three-dimensional model of an object according to the non-deleted original shape information and the integrated shape information.

With the above described model optimization apparatus, the redundant shapes of a three-dimensional model is deleted or integrated without damaging the outline of the model, and the data structure of the three-dimensional model can be automatically compressed. The three-dimensional model can be more easily changed in design and divided in a mesh format by deleting or integrating the redundant shapes, thereby improving the flexibility in edition.

Figure 2:
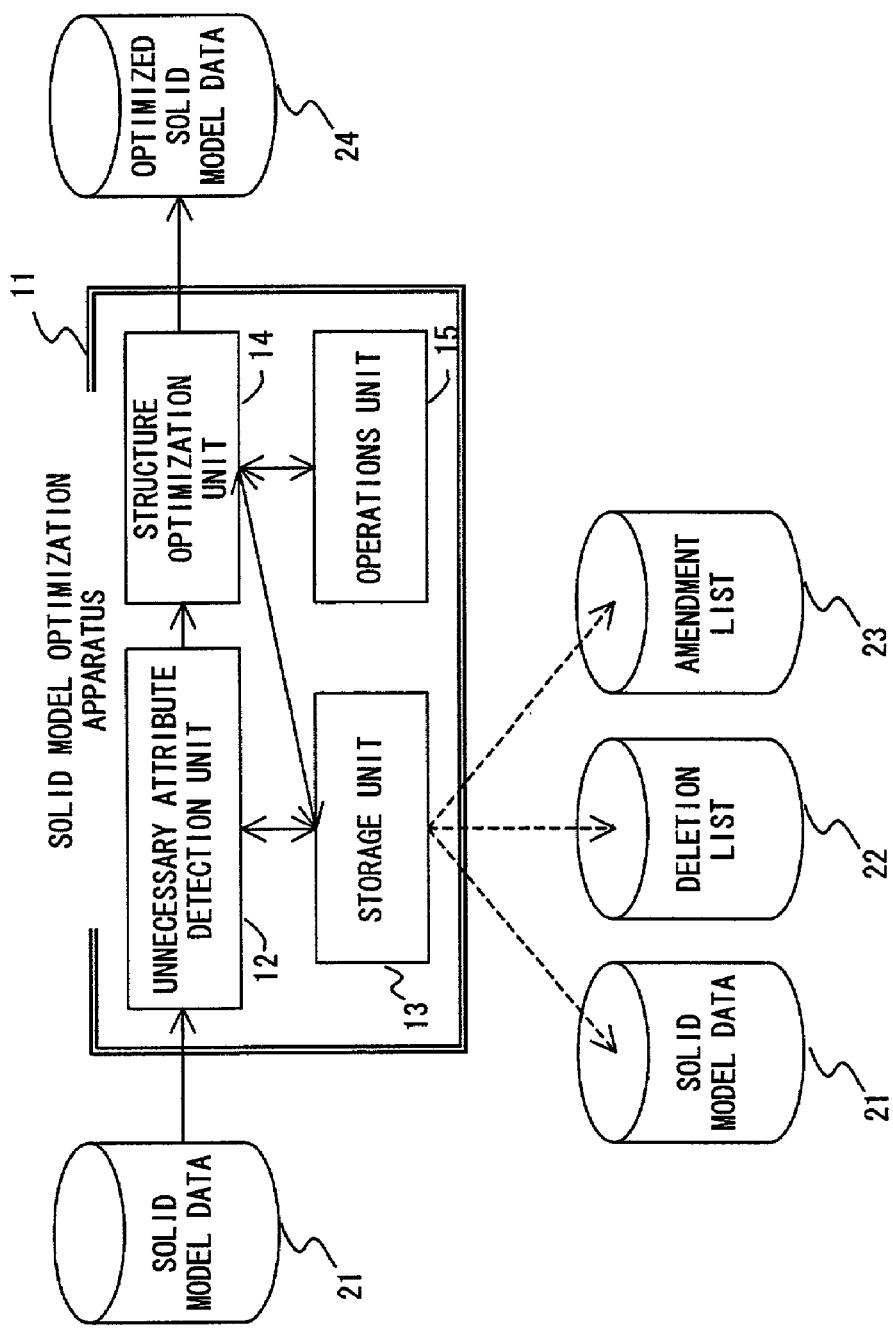
FIG. 2 shows the configuration of the model optimization apparatus.

For example, the detection unit 1 shown in FIG. 1 corresponds to an unnecessary attribute detection unit 12 and a storage unit 13 shown in FIG. 2, and the deletion unit 2 and the construction unit 3 shown in FIG. 1 correspond to a structure optimization unit 14 and an operations unit 15 shown in FIG. 2.

The model optimization apparatus according to the present invention detects and deletes redundant attributes, simultaneously releases and reconstructs the relationships among the attributes, and optimally edits the data structure of a three-dimensional model. Therefore, the model optimization apparatus automatically performs the following processes.

(1) detecting/deleting shapes unnecessary for the outline.

(2) detecting pattern attributes which corresponds to the repetition of the same shapes and changing the pattern attributes into one attribute.

(3) changing the reference position in the attribute arrangement (arrangement reference) into the substitute attribute having a smaller amount of data (work surface, curve, etc.) if necessary.

(4) reproducing a solid model.

As a result, the following effect can be obtained.

(1) providing a solid model which has smaller relation between attributes and can be easily amended (applicable to a similar design, etc.).

(2) effective application of a solid model to an analysis model, etc. in the structure analysis.

(3) reducing the amount of data of a solid model.

(4) shortening the time taken for arithmetic operations required in displaying and amending a solid model.

FIG. 2 shows the configuration of the model optimization apparatus. A solid model optimization apparatus 11 shown in FIG. 2 comprises the unnecessary attribute detection unit 12, the storage unit 13, the structure optimization unit 14, and the operations unit 15, optimizes assigned solid model data 21, and outputs optimized solid model data 24.

First, the unnecessary attribute detection unit 12 obtains the solid model data 21, and stores it in the storage unit 13 to quickly perform the subsequent processes. Furthermore, the unnecessary attribute detection unit 12 sequentially checks attributes based on a predetermined algorithm, detects the specific relationship between the attributes, and generates a deletion list 22 and a amendment list 23 in the storage unit 13. The deletion list 22 stores a list of attributes to be deleted, and the amendment list 23 stores a list of attributes to be amended.

When the processes are completed by the unnecessary attribute detection unit 12, the structure optimization unit 14 is activated, and the solid model data 21 stored in the storage unit 13 are sequentially regenerated. To regenerate refers to reconstruct a model by making appropriate amendments to the solid model data 21.

At this time, the structure optimization unit 14 regenerates only necessary attributes by referring to the deletion list 22 and the amendment list 23. For the attribute whose arrangement position or shape becomes unclear under the influence of the attributes to be deleted, the operations unit 15 is requested to perform the operations for the arrangement position or the shape, thereby performing the regenerating process based on the result of the operations, and outputting the optimized solid model data 24.

Figure 3:
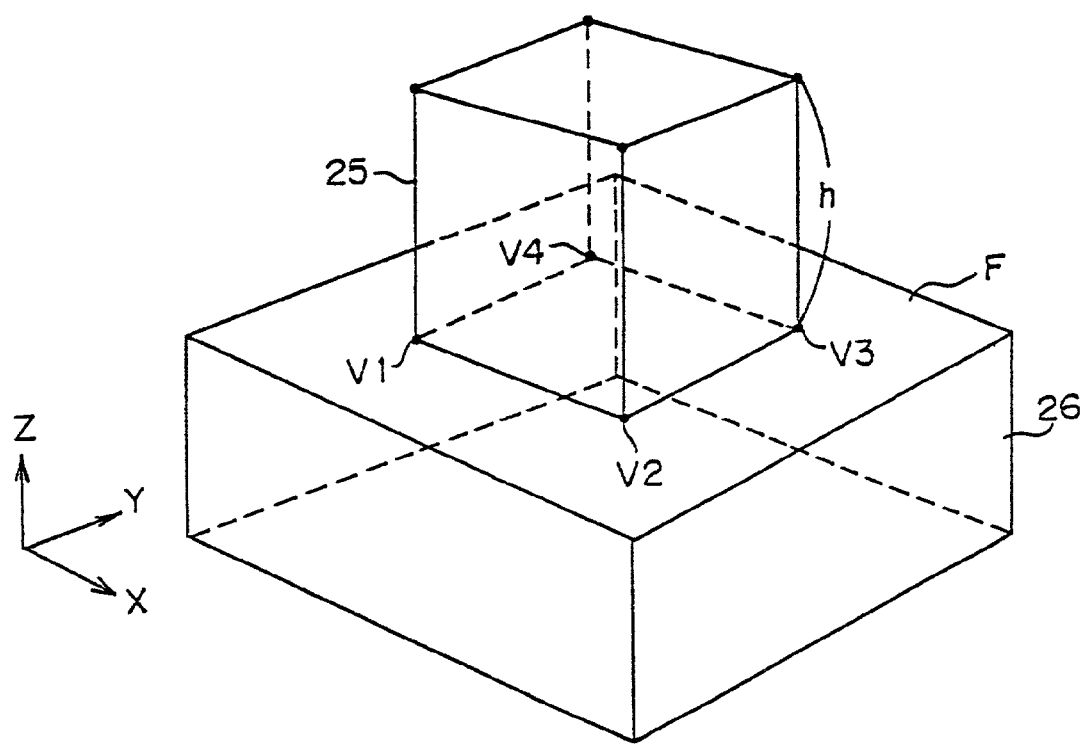
FIG. 3 shows the first attribute.

FIG. 3 shows an example of the attribute defined as apart of an object. In FIG. 3, a cuboid 25 is generated as a boss having its upper surface of an existing shape 26 as an arrangement plane, and contains information such as the coordinates of each vertex, the height h, the position on the arrangement plane F, the type of attribute, the generating method, etc. In this example, the square having four vertexes, that is, v1, v2, v3, and v4, on the arrangement plane F represents the sectional shape of the cuboid 25.

Figure 4:
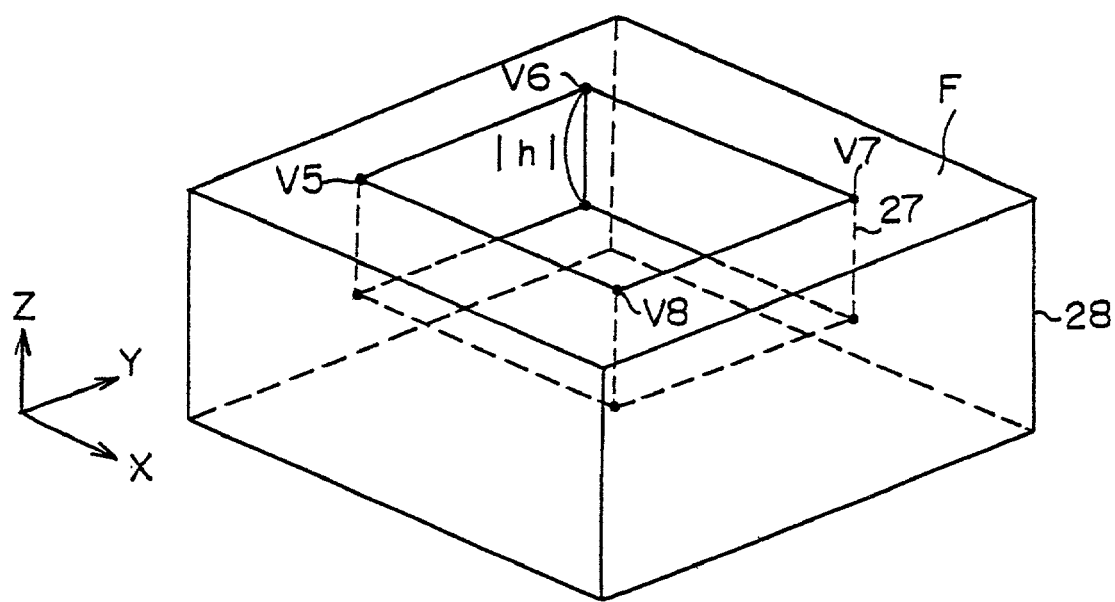
FIG. 4 shows the second attribute.

FIG. 4 shows an example of an attribute defined as an external portion of an object. In FIG. 4, a square hole 27 is generated as a hole having the upper surface of an existing shape 28 as an arrangement plane, and contains, as the cuboid 25 shown in FIG. 3, information such as the coordinates of each vertex, the height h, the position on the arrangement plane F, the type of attribute, the generating method, etc. In this example, the height h is defined by a negative value, and its absolute value |h| indicates the depth of the hole. Hereinafter, it is assumed that the height h indicates the height of an object or the depth of a hole. The square formed by the four vertexes v5, v6, v7, and v8 on the arrangement plane F indicates the sectional shape of the square hole 27.

FIG. 5 shows the data structure of each attribute contained in the solid model data 21. The solid model data 21 contains each piece of data of the vertex coordinates, the arrangement position, and the definition information of each attribute using the attribute number as identification information.

The attribute number is automatically assigned in order of generation of attributes by the three-dimensional CAD, and the coordinates of the vertexes indicate the coordinates of all vertexes forming an attribute. These coordinates of an attribute are mainly used to represent the sectional shape of the attribute. The arrangement position indicates the position at which an attribute is arranged in a solid model, and contains the information about the arrangement plane and the information about a position on the arrangement plane. The definition information contains the type of an attribute, a generating method, the information about parameters necessary for the generation, etc. For example, the height h shown in FIGS. 3 and 4 corresponds to the parameters in the vertical direction to the sectional shape.

The relationship between the attributes detected by the unnecessary attribute detection unit 12 based on the solid model data 21 can be various redundancies generated in the designing process as shown in FIGS. 6 through 10.

Figure 6:
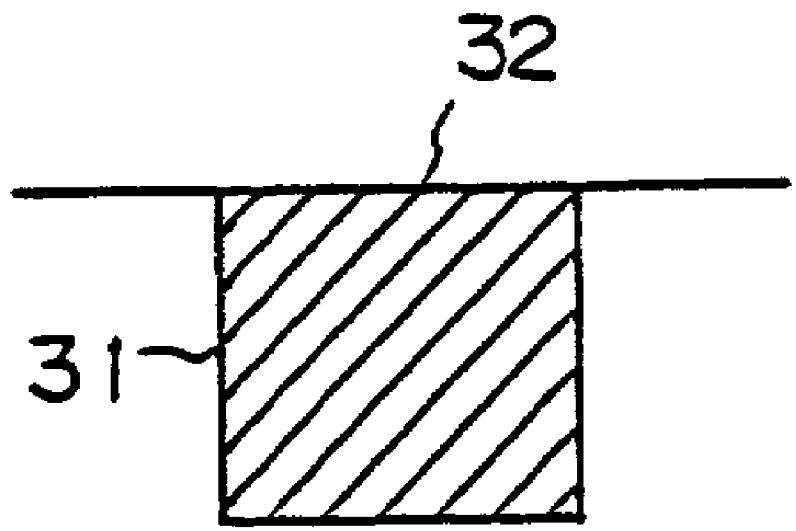
FIG. 6 shows the first filling.

FIG. 6 shows an example of filling a hole 31 by adding an object 32 having the same outline as the hole 31. In this case, the hole 31 and the object 32 are duplex attributes offsetting each other, thereby failing in forming the outline of the solid model. Therefore, these attributes are unnecessary. Similarly, when a defined object is removed with a hole having the same shape, their attributes are unnecessary.

Figure 7:
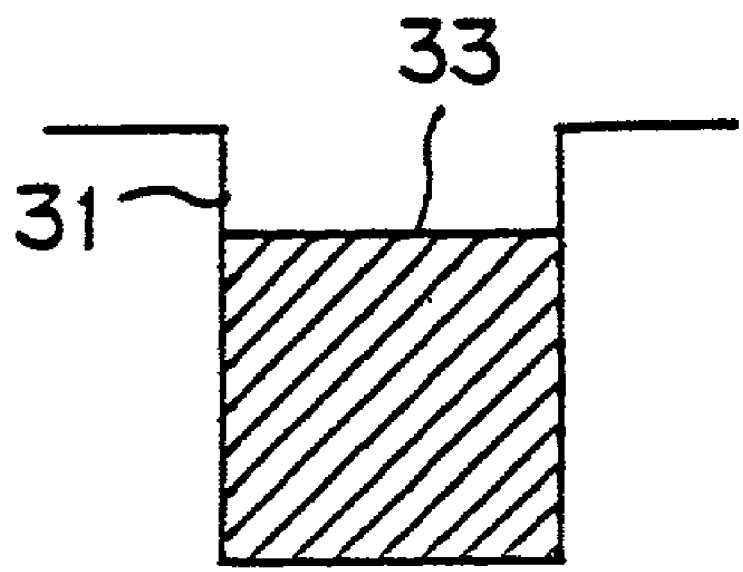
FIG. 7 shows a change in depth.

FIG. 7 shows an example of changing the depth of a defined hole 31 by adding an object 33 having the same sectional shape as the hole 31. In this case, the changed hole can be represented by one attribute. The hole 31 and the object 33 are redundant duplex attributes. Similarly, when the height of an object is changed with a hole having the same sectional shape as the object, their attributes are redundant.

Figure 8:
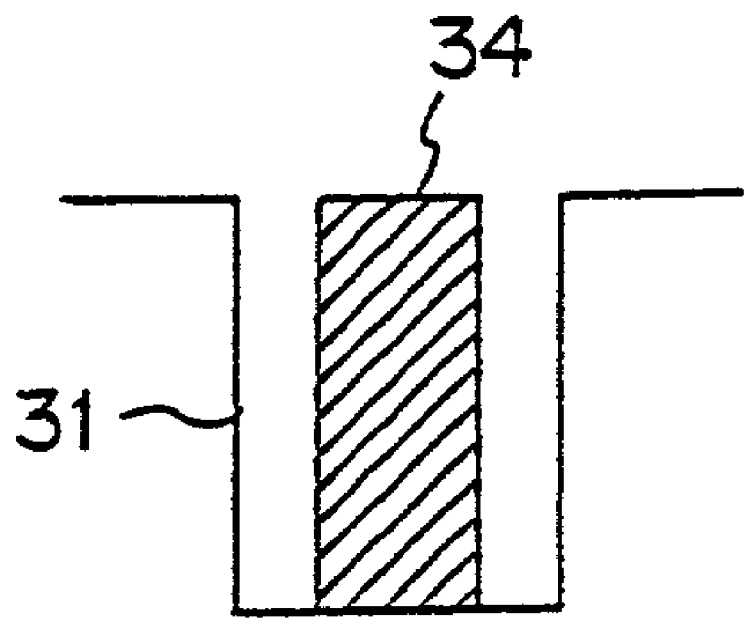
FIG. 8 shows a change in sectional shape.

FIG. 8 shows an example of changing the sectional shape of the hole 31 by adding an object 34 having the same value in height as the hole 31 in depth and having a smaller sectional shape than the hole 31. Also in this example, the changed hole can be represented as one attribute, and the hole 31 and the object 34 are redundant duplex attributes. Similarly, when the sectional shape of a defined object is changed with a hole having the same value in depth as the object in height, their attributes are redundant.

Figure 9:
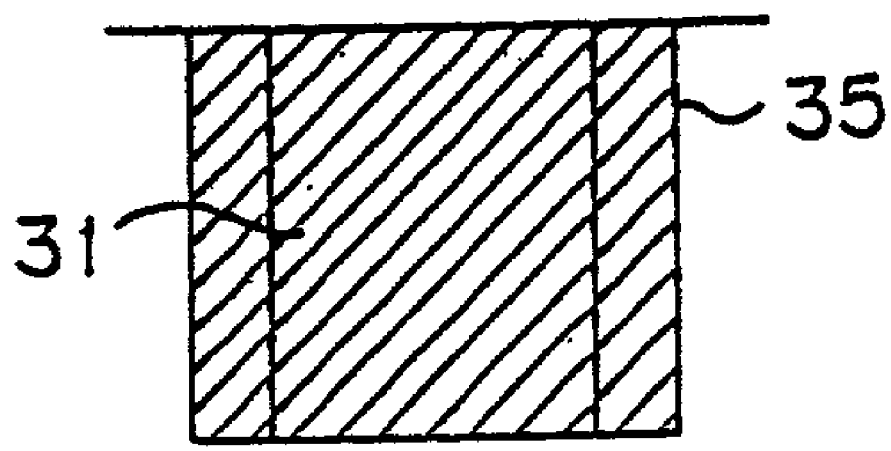
FIG. 9 shows the second filling.

FIG. 9 shows an example of filling the hole 31 by adding an object 35 having the same value in height as the hole 31 in depth and having a larger sectional shape than the hole 31. In this case, although the outlines of the hole 31 and the object 35 are different, the hole 31 and the object 35 have duplex attributes offsetting each other, and do not form the outline of the solid model as with the case shown in FIG. 3. Therefore, these attributes are unnecessary. Similarly, when a hole having the same value in depth as a defined object in height and having a larger sectional shape than the object is added to remove the object, their attributes are both unnecessary.

Figure 10:
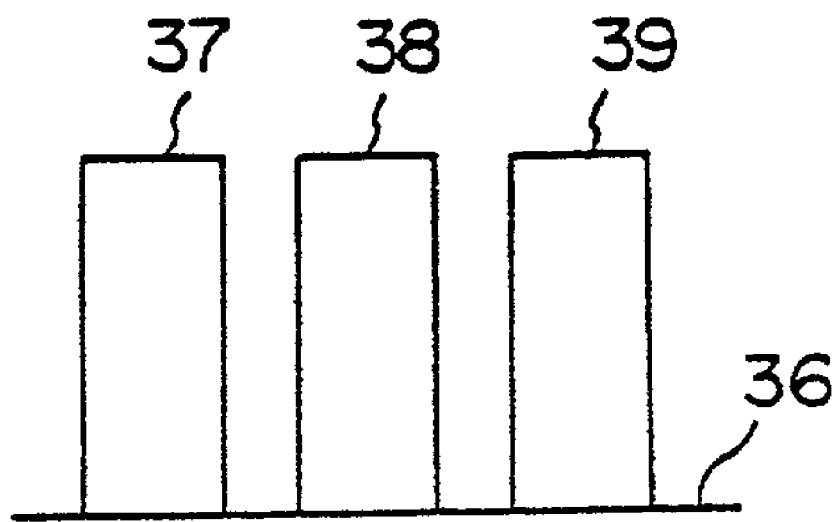
FIG. 10 shows a plurality of attributes indicating the same height.

FIG. 10 shows a plurality of objects 37, 38, and 39 having the same heights defined on the same arrangement plane 36. In this case, whether their sectional shapes are the same or not, the objects 37, 38, and 39 can be represented by one attribute and the attributes of the plurality of objects are redundant. Similarly, a plurality of holes having the same depths defined on the same arrangement plane have redundant attributes to each other.

When a plurality of attributes have the same shapes, they are often defined as pattern attributes. A pattern attribute refers to an attribute newly defined by automatically duplicated or represented as a numeric expression using the shape and the arrangement position of an existing attribute. These plurality of attributes can be simultaneously defined, but since they have the same shapes, they can be represented by one attribute. Therefore, these plurality of attributes are redundant.

Figure 11:
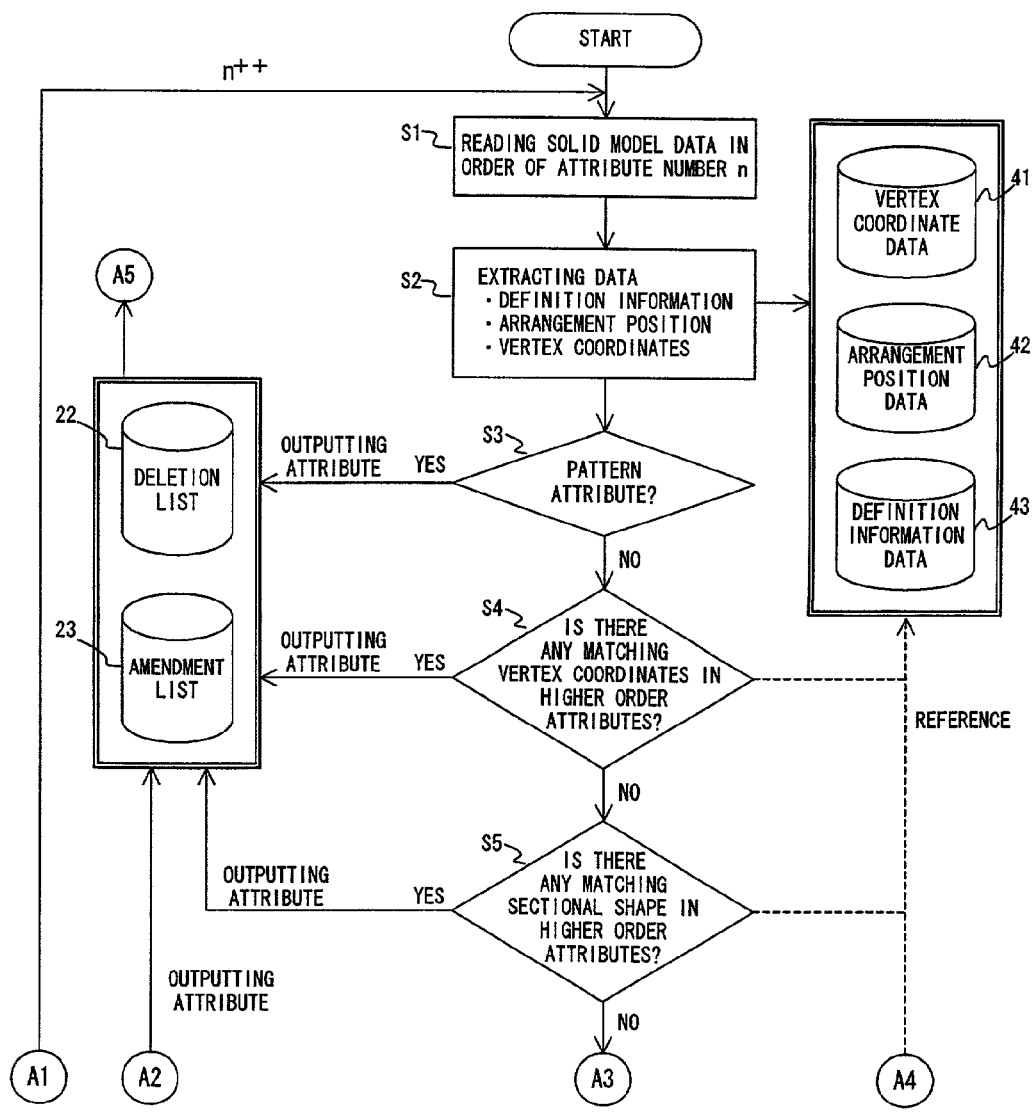
FIG. 11 is a flowchart (1) of the process performed by the unnecessary attribute detection unit.
Figure 12:
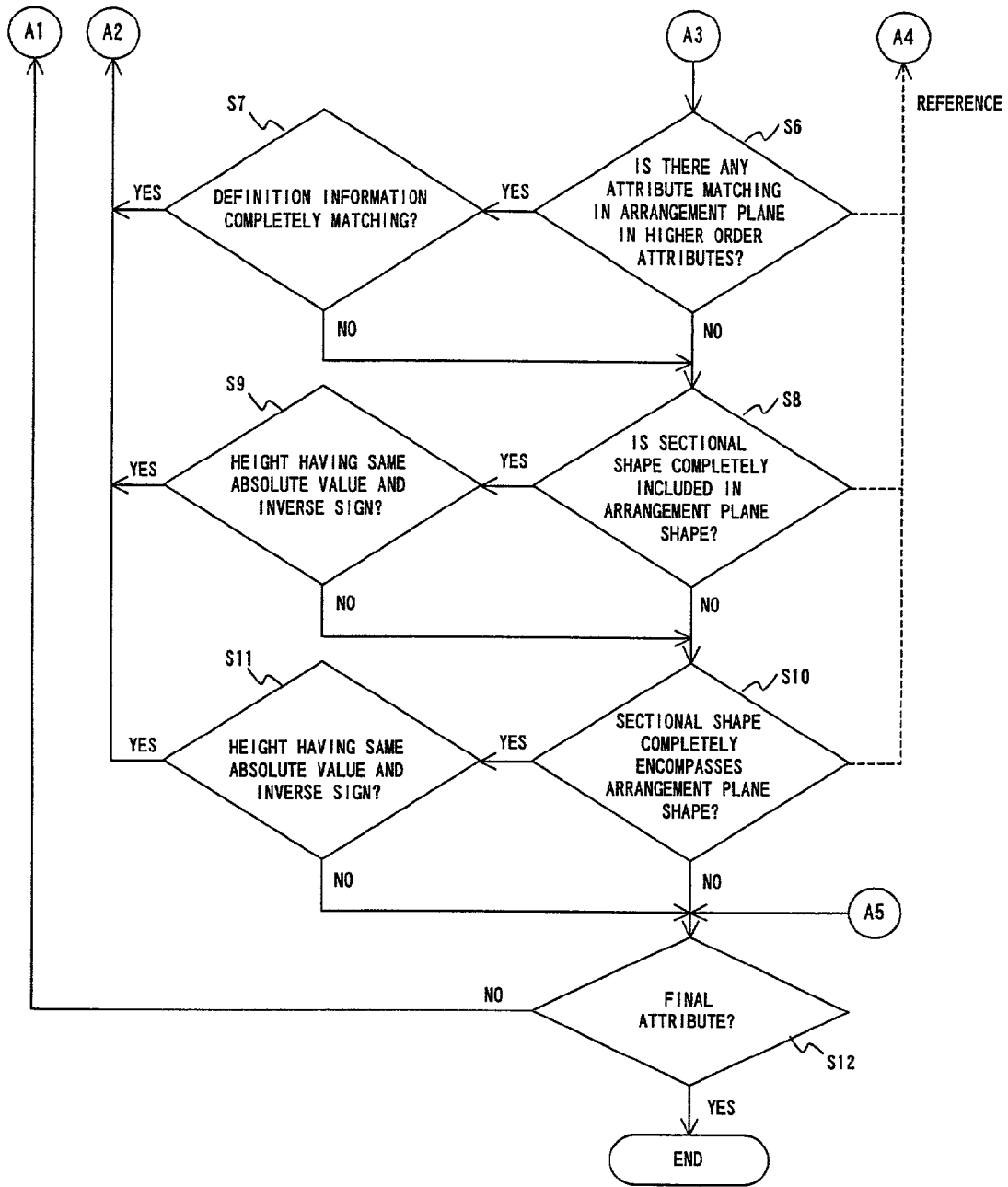
FIG. 12 is a flowchart (2) of the process performed by the unnecessary attribute detection unit.

FIGS. 11 and 12 are flowcharts of the processes performed by the unnecessary attribute detection unit 12 for detecting the above described redundant attributes. First, the unnecessary attribute detection unit 12 obtains the solid model data 21 in order of defined attribute numbers (step S1 shown in FIG. 11), extracts the vertex coordinates, the arrangement position, and the definition information about each attribute, and then generates data table files of vertex coordinate data 41, arrangement position data 42, and definition information data 43 (step S2).

Next, by referring the data tables, a detecting process is performed for detecting attributes which can be deleted or integrated. First, it is determined whether or not a read attribute n is a pattern attribute (step S3). Then, if the attribute n is a pattern attribute, the information is output to the amendment list 23, and it is determined whether or not the attribute n is the final attribute (step S12 in FIG. 12). If it is not the final attribute, n is incremented (n++ in FIG. 11), and control is passed to the process for the next attribute n+1.

If the attribute n is not a pattern attribute, then it is determined whether or not any of the already read higher order attributes have vertex coordinates matching the vertex coordinates of the attribute n (step S4). If there is such a higher order attribute, the higher order attribute and the attribute n are assumed to have the relationship shown in FIG. 6, and the information of those attributes is output to the deletion list 22 to perform the processes in and after step S12.

If such a higher order attribute cannot be detected, then it is determined whether or not any of the higher order attributes has the sectional shape matching the sectional shape of the attribute n (step S5). If such a higher order attribute can be detected, then it is determined that the higher order attribute and the attribute n have the relationship as shown in FIG. 7, and the information about the attribute n is output to the deletion list 22, the information about the higher order attribute is output to the amendment list 23, and the processes in and after step S12 are performed.

If such a higher order attribute cannot be detected, then it is determined whether or not any of the higher order attributes has an arrangement plane matching the arrangement plane of the attribute n (step S6 in FIG. 12). If such a higher order attribute can be detected, then it is determined whether or not the definition information about the higher order attribute completely matches the definition information about the attribute n (step S7).

If they match each other, it is assumed that there is the relationship as shown in FIG. 10 between the higher order attribute and the attribute n, the information about the attribute n is output to the deletion list 22, the information about the higher order attribute to the amendment list 23, and the processes in and after step S12 are performed. At this time, the information about the sectional shape of the attribute n is added to the information about the higher order attribute output to the amendment list 23.

When there is not a corresponding attribute in step S6, or the definition information does not match between the attributes in step S7, then it is determined whether or not the sectional shape can be completely included in the shape of the arrangement plane of the attribute n (step S8). If it is included in the shape of the arrangement plane, the height of the higher order attribute including the arrangement plane is compared with the height of the attribute n (step S9).

If the absolute values of the heights are equal to each other and the heights have inverse signs, it is determined that there is the relationship shown in FIG. 8 between the higher order attribute and the attribute n, the information about the attribute n is output to the deletion list 22, the information about the higher order attribute is output to the amendment list 23, and the processes in and after step S12 are performed. At this time, the information about the sectional shape of the attribute n is added to the information about the higher order attribute output to the amendment list 23.

When the sectional shape is not included in the shape of the arrangement plane in step S8, or when the heights of the attributes do not have the above mentioned relationship in step S9, it is determined whether or not the sectional shape completely encompasses the shape of the arrangement plane of the attribute n (step S10). If the sectional shape encompasses the arrangement plane, then the height of the higher order attribute containing the arrangement plane is compared with the height of the attribute n (step S11). If their absolute values are the same and their signs are inverse, then it is assumed that the higher order attribute and the attribute n have the relationship shown in FIG. 9, and the information of those attributes is output to the deletion list 22 to perform the processes in and after step S12.

If the sectional shape does not encompass the arrangement plane in step S10, or the heights of the higher order attribute and the attribute n have not the above described relationship in step S11, the processes in and after step S12 are performed. If the attribute n is the final attribute in step S12, then the process terminates.

In the above described processes, the information about the redundant attributes to be deleted is collected in the deletion list 22, and the information about the redundant attributes to be amended is collected in the amendment list 23. The structure optimization unit 14 generates the optimized solid model data 24 using these lists.

Figure 13:
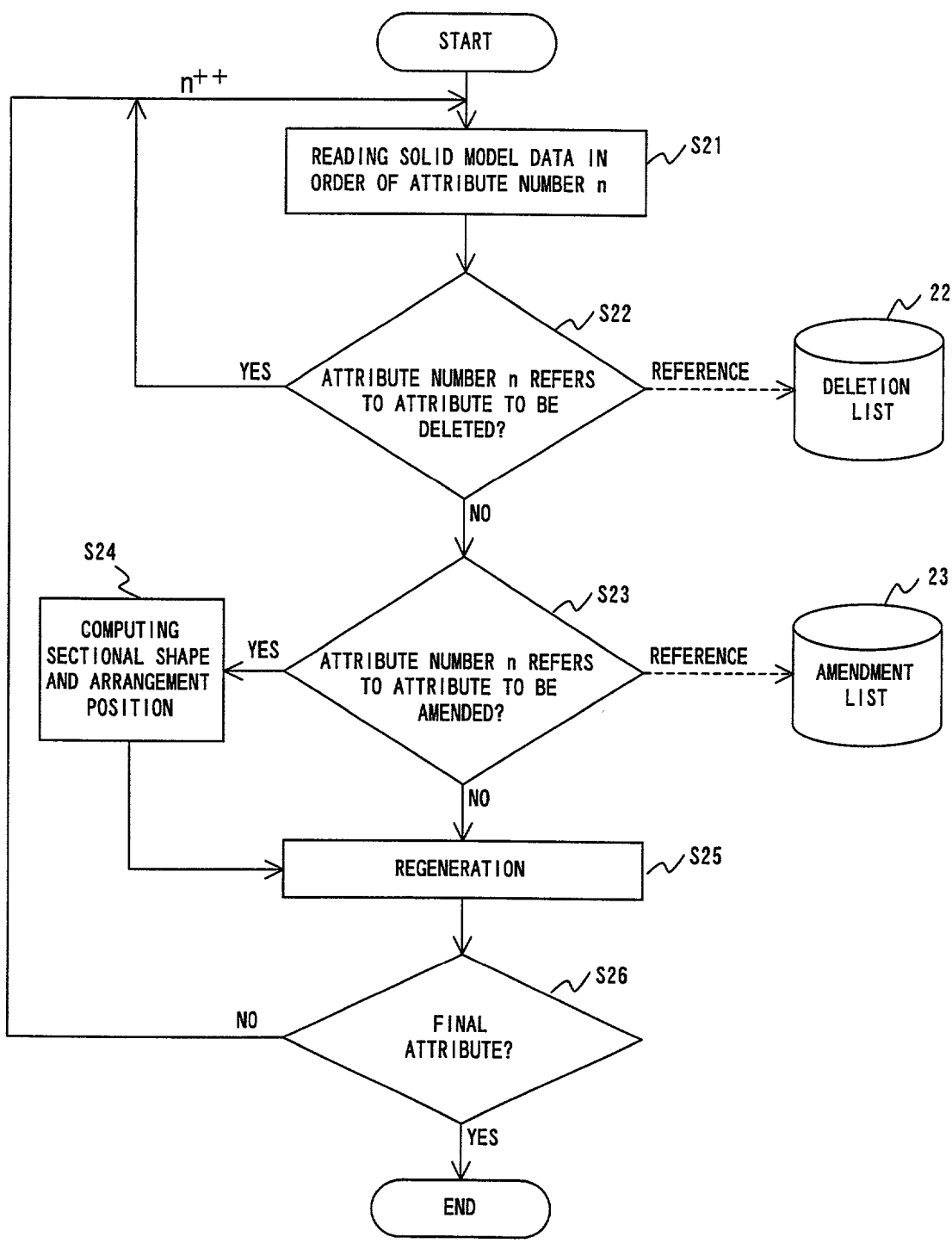
FIG. 13 is a flowchart of the process performed by the structure optimization unit.

FIG. 13 is a flowchart of the process performed by the structure optimization unit 14. First, the structure optimization unit 14 obtains the solid model data 21 in order of attribute numbers (step S21), and determines whether or not the obtained attribute n has been listed by referring to the deletion list 22 (step S22). If the attribute n has been listed in the deletion list 22, it is assumed that the attribute n is not to be regenerated, and control is passed to the process to be performed on the next attribute n+1. If the attribute n has not been listed in the deletion list 22, then the amendment list 23 is referred to, and it is determined whether or not the attribute n has been listed (step S23). If the attribute n has been listed there, then the sectional shape, the arrangement position, etc. are computed based on the listing information (step S24), and the attribute n is regenerated according to the amended information (step S25).

If the attribute n has not been listed in the amendment list 23, it is regenerated according to the obtained information (step S25). At this time, it is possible that the attribute n cannot be regenerated as is under the influence of the relationship between the attribute n and a deleted attribute. In this case, as described later, the relation between the attributes is appropriately released to regenerate the attribute.

Next, it is determined whether or not the attribute n is the final attribute (step S26). If the attribute n is not the final attribute, control is passed to the process for the next attribute n+1, and the process terminates when the attribute n is the final attribute. A group of the finally regenerated attributes is output as the optimized solid model data 24.

In the above described process, a solid model defined by a large number of attributes including unnecessary redundant attributes can be automatically reconstructed using only the attributes necessary for the outline. When the solid model is reconstructed, the amount of data required for the solid model can be reduced by deleting unnecessary attributes and integrating a plurality of attributes into a single attribute, thereby easily processing the data. In addition, a solid model can be more freely edited by releasing the relation between attributes. Next, a method of optimizing a solid model is described below using a practical example of the solid model shown in FIG. 14. The solid model shown in FIG. 14 contains the following attributes, and FIG. 15 shows the solid model data before the optimization.

attribute [1]: base
attribute [2]: square hole (portion indicated by diagonal lines)
attribute [3]: four bosses
attribute [4]: cuboid (portion indicated by diagonal lines)
attribute [5]: square hole
attribute [6]: cuboid There has been an intention to delete the above described hole of the attribute [2] when the design is changed. However, it has been proved that the attribute [3] refers to the attribute [2], and therefore the attribute [2] cannot be solely deleted. As a result, an attribute [4] is newly added to cover the hole of the attribute [2].

Figure 14:
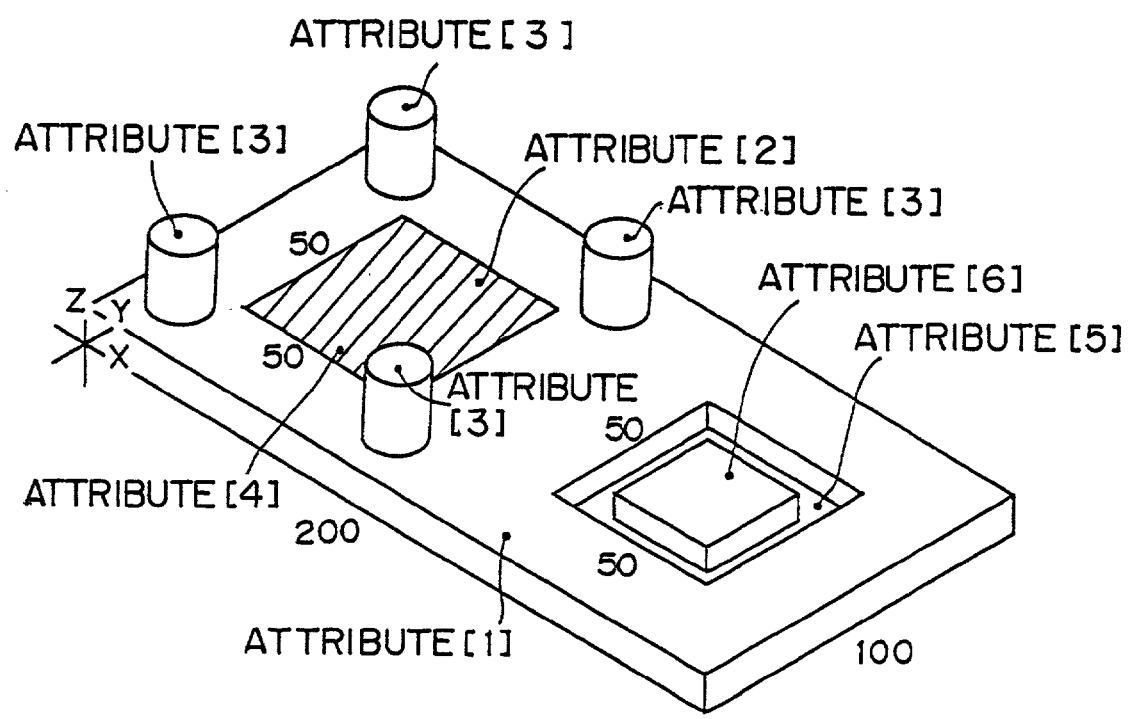
FIG. 14 shows an example of a solid model.
Figure 18:
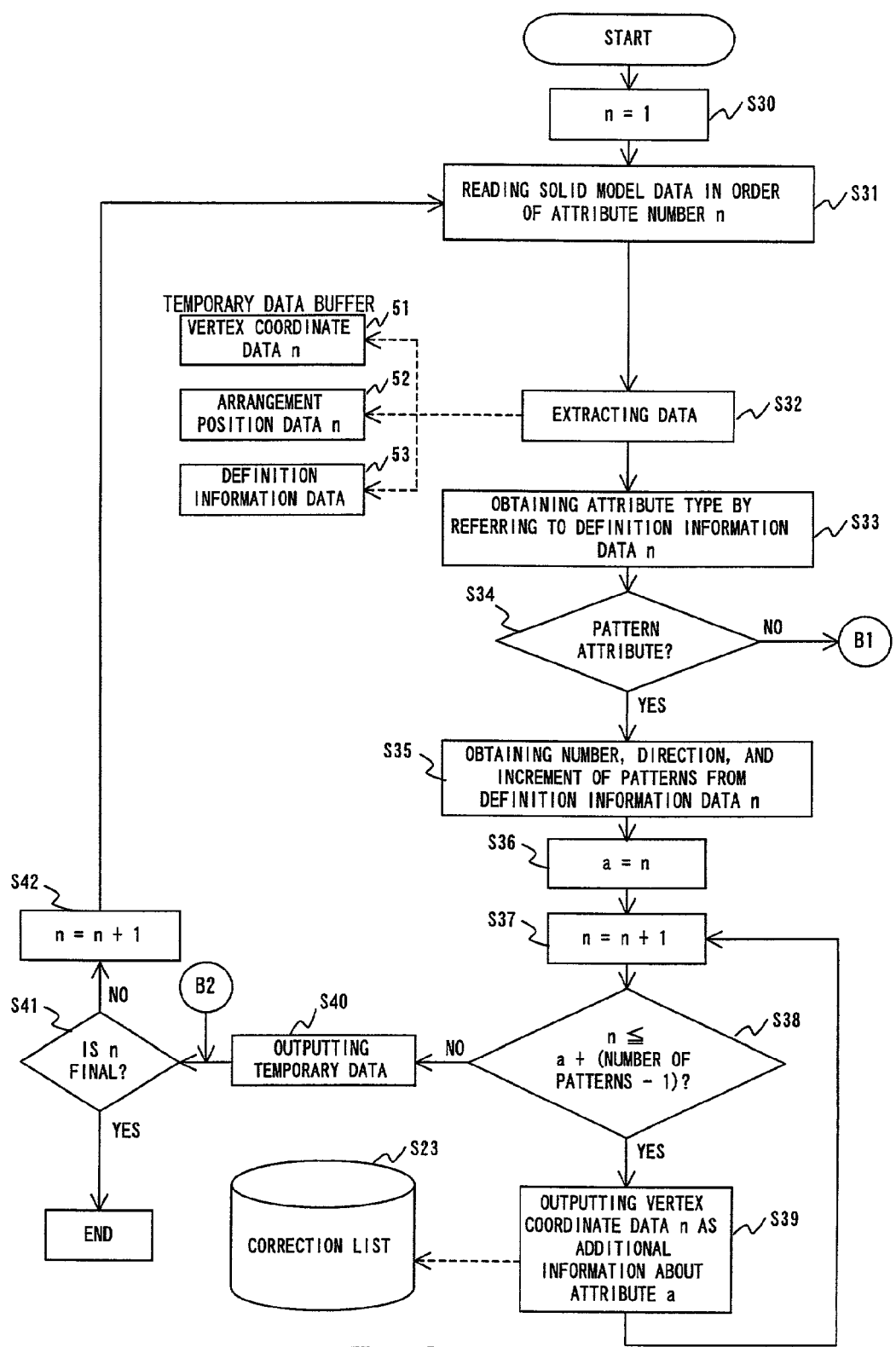
FIG. 18 is a flowchart (1) of a detecting process.

In FIG. 15, the numbers are automatically assigned to attributes. In FIG. 14, the numbers are represented by [n]. The items refer to the structures shown in FIG. 5, and the data indicates the data of each item.

First, the vertex coordinate data of the attribute [1] represents the coordinates of the eight vertexes {(x1, y1, z1), (x2, y2, z2), (x3, y3, z3), (x4, y4, z4)}, (x5, y5, z5), (x6, y6, z6), (x7, y7, z7), (x8, y8, z8), which compose the shape of the base (cuboid). Among these vertexes, the four vertexes enclosed by the { } form the sectional shape generated when the attribute [1] is cut at the plane parallel to the XY plane.

Since the attribute [1] is the first generated attribute, there is no arrangement position data of the attribute. The definition information data of the attribute [1] indicates that the type is 'projection' and the generation method is 'projection' with the height h as a parameter of the amount of projection. The 'projection' refers to an object or a method of generating the object by sliding the sectional shape defined by vertex coordinates by the height h in the Z axis direction.

Next, the vertex coordinate data of the attribute [2] represents the coordinates of the eight vertexes forming a cuboid. Among the vertexes, the four vertexes enclosed by the { } form the sectional shape in the upper surface F1 of the attribute [1], which is the arrangement plane.

In the arrangement position data of the attribute [2], '1:F1' indicates that the face F1 of the attribute [1] is an arrangement plane, '1:E1-25' indicates that the distance from the edge E1 of the attribute [1] to the arrangement position is 25, and '1:E2-25' indicates that the distance from the edge E2 of the attribute [1] to the arrangement position is 25.

Thus, the arrangement position data contains the attribute numbers specifying other attributes used as arrangement references. In this case, the attributes [1] and [2] have parent-child relationship. The arrangement position data of other attributes also contain the attribute numbers of the parent attributes as references.

The definition information data of the attribute [2] indicates that the type is 'cut' and the generation method is 'projection' with the height h as a parameter of the amount of projection. The 'cut' refers to a hole generated by sliding the sectional shape defined by vertex coordinates by the height h, which corresponds to a depth in this example, in the Z axis direction. Hereinafter, when the height h is a negative value, it refers to a projection in the negative direction of the Z-axis.

Next, the attribute [3] indicates the centers of the circles which are the sectional shapes of the four cylinders as vertexes. The vertex coordinate data indicates the coordinates of the center of the circle and the radius of the circle. Each cylinder is described as, for example, {(x1, y1, z1)r} (x2, y2, z2), and the coordinates (x1, y1, z1) enclosed by { } indicate the center of the circle on the upper surface of the attribute [1], which is an arrangement plane, and r indicates the radius of the circle. In addition, the coordinates (x2, y2, z2) indicate the center of the circle on the upper surface of the cylinder.

In the arrangement position data of the attribute [3], '1:F1' indicates that the face F1 of the attribute [1] is an arrangement plane, '2:E1-12.5' indicates that the distance from the edge E1 of the attribute [2] to the arrangement position is 12.5, and '2:E2-12.5' indicates that the distance from the edge E2 of the attribute [2] to the arrangement position is 12.5. Thus, the attribute [3] refers to two attributes [1] and [2] as arrangement references. The attribute [3] has the same definition information data as the attribute [1].

Next, the vertex coordinate data of the attribute [4] indicate the coordinates of the eight vertexes forming a cuboid. The vertex coordinate data match the vertex coordinate data of the attribute [2].

In the arrangement position data of the attribute [4], '1:F2' indicates that the bottom face F2 of the attribute [1] is an arrangement plane, '1:E5-25' indicates that the distance from the edge E5 of the attribute [1] to the arrangement position is 25, and '1:E6-25' indicates that the distance from the edge E6 of the attribute [1] to the arrangement position is 25.

In addition, the definition information data of the attribute [4] indicates that the type is 'projection' and the generation method is 'projection' with the height h as a parameter of the amount of projection. In the data, the type is different from that of the attribute [2], and indicates the internal portion of an object. The generating method is the same as that of the attribute [2], and the height h is equal in an absolute value, but has an inverse sign as compared with the attribute [2]. These states come from the arrangement plane different from that of the attribute [2].

When the data of the attribute [2] is compared with the data of the attribute [4], the attributes offset each other, and do not contribute to the outline of the solid model. Therefore, they are the attributes that can be deleted.

Next, the vertex coordinate data of the attribute [5] indicate the coordinates of the eight vertexes forming a cuboid. The four vertexes enclosed by the { } form the sectional shape in the upper surface of the attribute [1] which is an arrangement plane.

In the arrangement position data of the attribute [5], '1:F1' indicates that the face F1 of the attribute [1] is an arrangement plane, '1:E1-125' indicates that the distance from the edge E1 of the attribute [1] to the arrangement position is 125, and '1:E2-25' indicates that the distance from the edge E2 of the attribute [1] to the arrangement position is 25. The attribute [5] has similar definition information data to the attribute [2].

Next, the vertex coordinate data of the attribute [6] indicate the coordinates of the eight vertexes forming a cuboid. The four vertexes enclosed by the { } form the sectional shape in the bottom surface of the attribute [5] which is an arrangement plane.

In the arrangement position data of the attribute [6], '1:F1' indicates that the face F1 of the attribute [5] is an arrangement plane, '1:E1-10' indicates that the distance from the edge E1 of the attribute [1] to the arrangement position is 10, and '1:E2-10' indicates that the distance from the edge E2 of the attribute [1] to the arrangement position is 10.

The attribute [6] has similar definition information data to the attribute [1]. Since the attributes [5] and [6] have the relationship as shown in FIG. 8, they can be integrated into an attribute.

In this example, the attribute type can be projection or cut, and the generating method is projection, but other optional types and generating methods can be similarly defined.

For example, in the case of a series of the above described pattern attributes, the type is described as a pattern, and the number of patterns, the direction of patterns, and the pattern increment value are set as parameters. The number of patterns indicates a total number of pattern attributes belonging to the same group, and is set to the pattern attribute first generated in the group. The direction of patterns refers to the direction of copying pattern attributes. The pattern increment value refers to the interval between pattern attributes. If rotation is used as a generating method, the rotation angle is set as a parameter.

The unnecessary attribute detection unit 12 generates a deletion list as shown in FIG. 16, and an amendment list as shown in FIG. 17. The deletion list contains the data table of the attributes [2], [4], and [6]. The amendment list contains the vertex coordinate data of the attribute [6] as the additional vertex data of the attribute [5] according to the deletion of the attribute [6]. The additional vertex data indicates the coordinates of the vertexes of an attribute integrated into another attribute.

The process of detecting an unnecessary attribute by the unnecessary attribute detection unit 12 is described in detail by referring to the flowcharts shown in FIGS. 18 through 22. First, the unnecessary attribute detection unit 12 reads the data table of a solid model in order of attributes numbers (step S31) with n set to 1 (step S30), extracts the vertex coordinate data n, the arrangement position data n, and the definition information data n of the attribute n, and stores the data in temporary data buffers 51, 52, and 53 (step S32).

Next, the type of the attribute n is obtained by referring to the definition information data n (step S33), and it is determined whether or not the type corresponds to a pattern attribute (step S34). If the attribute n is a pattern attribute, the number of patterns, the direction of pattern, and the pattern increment value are obtained from the definition information data n (step S35), and a is set to n (step S36) and n is set to n+1 (step S37).

Then, n is compared with a+(number of patterns−1) (step S38), where a+(number of patterns−1) corresponds to the attribute number of the final pattern attribute in the group to which the attribute a belongs.

If n≦a+(number of patterns−1), then the attribute n is an attribute in the group. As a result, the vertex coordinate data n is output as additional information about the attribute a to the amendment list 23 (step S39), and the processes in and after step S37 are repeated. Thus, all vertex coordinate data of the pattern attribute derived from the attribute a are stored in the amendment list 23.

When n>a+(number of patterns−1), the data tables of the attributes from a through a+(number of patterns−1) are output to the files 41, 42, and 43 shown in FIG. 11 from the buffers 51, 52, and 53 (step S40), and it is determined whether or not n is the attribute number of the final attribute (step S41). If the attribute n is not the final attribute, n is set to n+1 (step S42), and the processes in and after step S31 are repeated.

Figure 19:
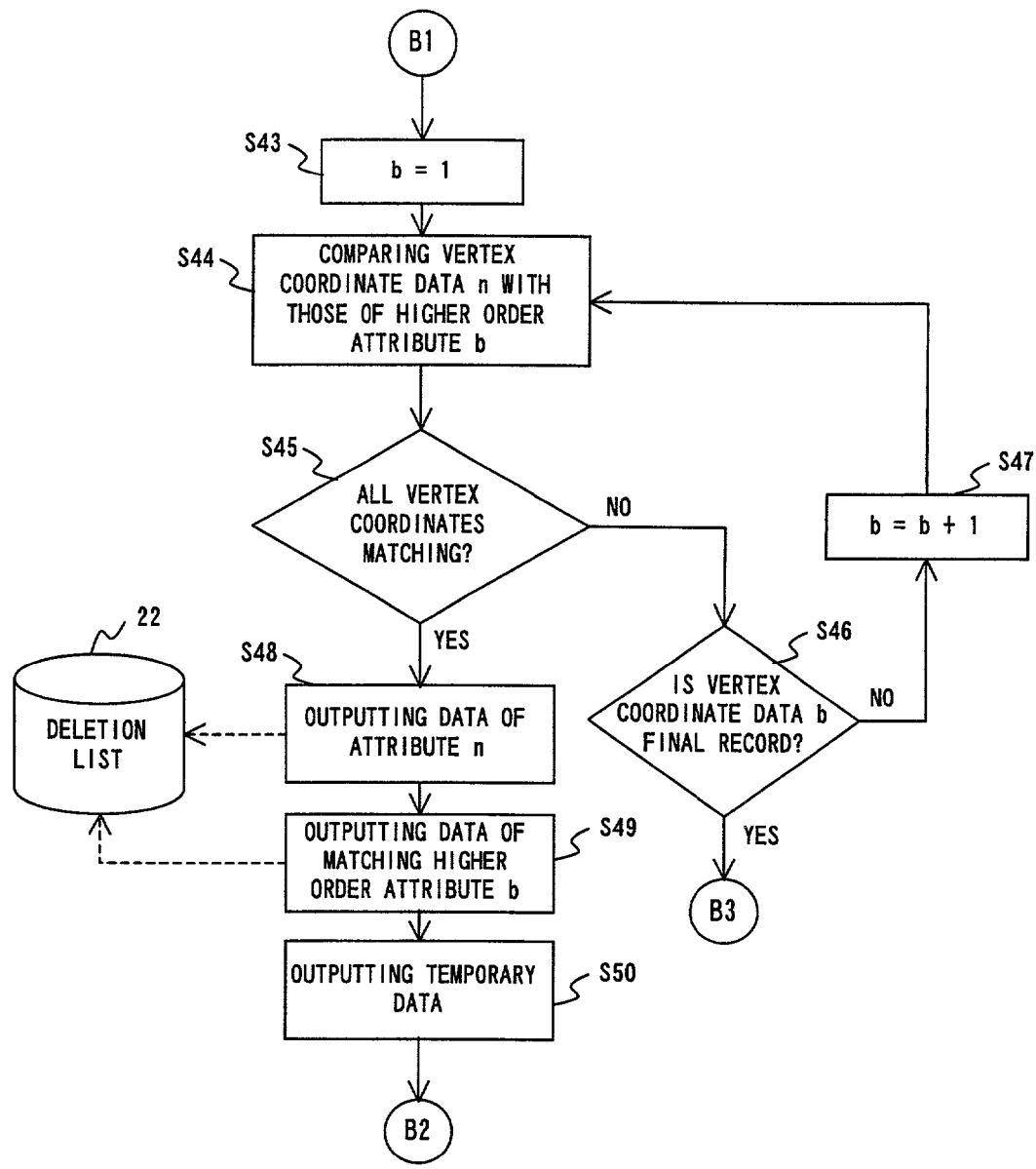
FIG. 19 is a flowchart (2) of a detecting process.

If it is determined in step S34 that the attribute n is not a pattern attribute, then b is set to 1 (step S43 shown in FIG. 19). The vertex coordinate data n of the attribute n is compared with the vertex coordinate data b of the higher order attribute b in the file 41 (step S44), and it is determined whether or not all vertex coordinates match one another (step S45). If there is a vertex whose coordinates do not match those of the corresponding vertex, it is determined whether or not the vertex coordinate data b refers to the final record in the file 41 (step S46).

If the vertex coordinate data b does not refer to the final record, b is set to b+1 (step S47), and the processes in and after step S44 are repeated. If it is determined in step S45 that the vertex coordinate data n matches the vertex coordinate data b, it is assumed that the attribute n and the attribute b have a relationship as shown in FIG. 6.

Then, the data table of the attribute n is output to the deletion list 22 (step S48), and the data table of the attribute b is output to the deletion list 22 (step S49). Then, the data table of the attribute n is output from the buffers 51, 52, and 53 to the files 41, 42, and 43 (step S50), and the processes in and after step S41 are performed.

If it is determined in step S46 that the vertex coordinate data b is the final record, then it is assumed that no higher order attribute having the same shape as the attribute n exists, and c is set to 1 (step S51 shown in FIG. 20). The vertex coordinate data n of the attribute n is compared with the vertex coordinate data c of the higher order attribute c in the file 41 (step S52), and it is determined whether or not their vertex coordinates data of the sectional shape match each other (step S53).

In the case of the vertex coordinate data shown in FIG. 15, the X coordinate and the Y coordinate of the coordinates in the { } correspond to the vertex coordinates of the sectional shape. If there is a vertex whose coordinates do not match those of the corresponding vertex, then it is determined whether or not the vertex coordinate data c refers to the final record in the file 41 (step 54).

If the vertex coordinate data c does not refer to the final record, c is set to c+1 (step S55), and the processes in and after step S52 are repeated. If it is determined in step S53 that the vertex coordinates of the sectional shapes match one another, then it is assumed that the attribute n and the attribute c can be integrated into an attribute.

Then, the height hn is obtained from the definition information data n (step S56), the height hc is obtained from the definition information data c of the higher order attribute c in the definition information data 43 (step S57), the result of adding the hn to the hc is obtained as hc, and the height of the attribute c is changed (step S58). Thus, for example, the two attributes having the relationship as shown in FIG. 4 can be integrated into an attribute.

Next, the data table of the attribute n is output to the deletion list 22 (step S59), the obtained height hc is stored in the definition information data c of the attribute c, and the definition information data c are output to the amendment list 23 (step S60). Then, the data table of the attribute n is output from the buffers 51, 52, and 53 to the files 41, 42, and 43 (step S61) and the processes in and after step S41 are performed.

If it is determined in step S54 that the vertex coordinate data c refers to the final record, then it is assumed that no higher order attribute having the same sectional shape as the attribute n exists, d is set to 1 (step S62 shown in FIG. 21), the arrangement position data n of the attribute n is referred to, and the arrangement plane information of the attribute n is obtained (step S63).

Then, the arrangement plane information described in the arrangement position data d of the higher order attribute d in the file 42 is compared with the arrangement plane information of the attribute n (step S64), and it is determined whether or not the arrangement planes match each other (step S65). If they do not match each other, then it is determined whether or not the arrangement position data d refers to the final record in the file 42 (step S66).

If the arrangement position data d does not refer to the final record, d is set to d+1 (step S67), and the processes in and after step S64 are repeated. If it is determined in step S65 that the arrangement planes match each other, then the definition information data d of the higher order attribute d in the file 43 is compared with the definition information data n (step S68), and it is determined whether or not they match each other (step S69). If the definition information data n matches the definition information data d, then the attribute n and the attribute d indicate the shapes having the same type and height on the same plane. As a result, these attributes can be integrated into an attribute.

Therefore, the vertex coordinate data n of the attribute n is output to the amendment list 23 as additional information about the attribute d (step S70), and the data table of the attribute n is output to the deletion list 22 (step S71). Thus, for example, the two attributes having the relationship shown in FIG. 10 can be integrated into an attribute. The data tables of the attributes n are output from the buffers 51, 52, and 53 to the files 41, 42, and 43 (step S72), and the processes in and after step S41 are repeated.

If it is determined in step S66 that the arrangement position data d refers to the final record, or it is determined in step S69 that the definition information data n does not match the definition information data d, then it is assumed that no higher order attribute having the same type and the height as the attribute n exists on the same arrangement plane.

Figure 22:
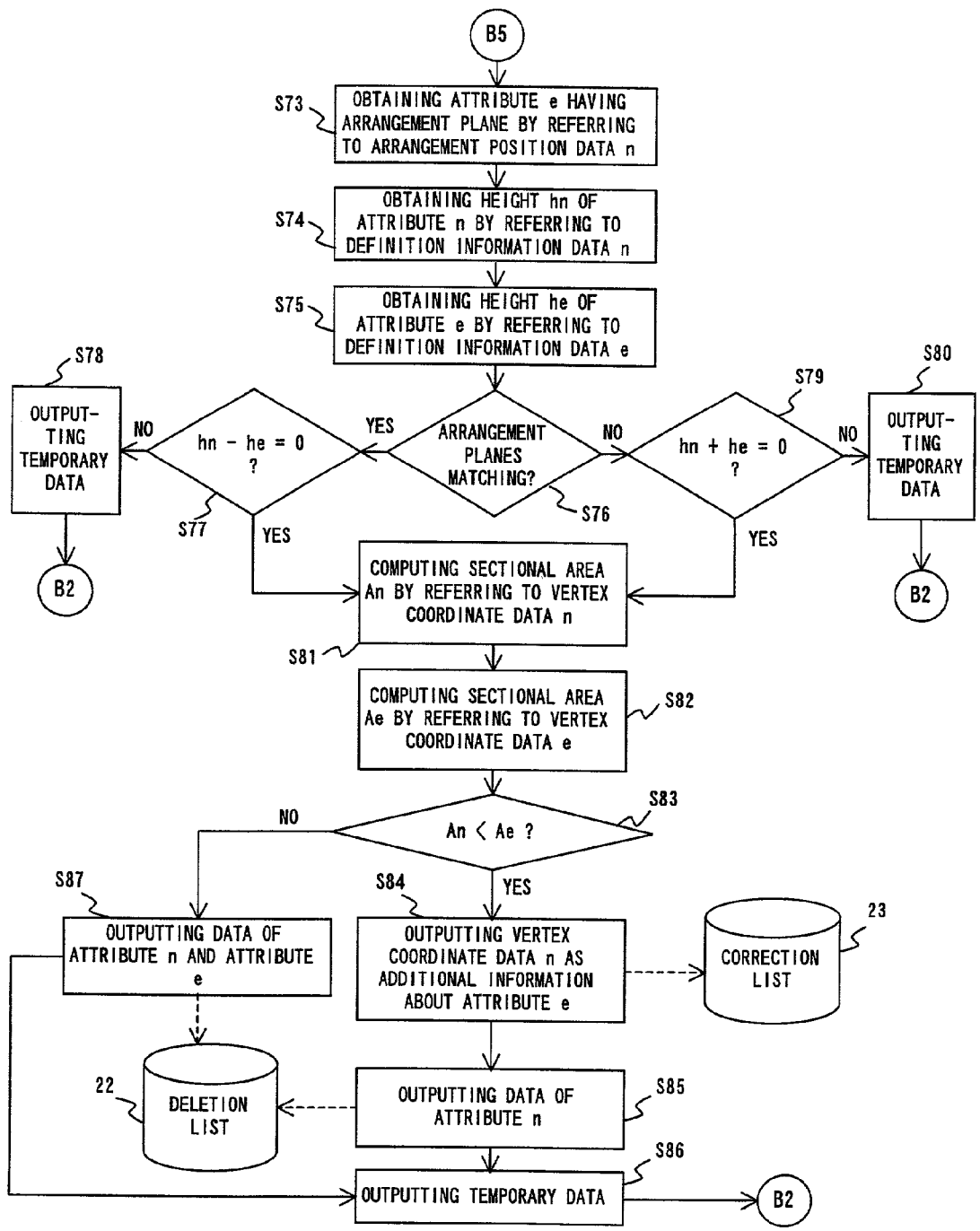
FIG. 22 is a flowchart (5) of a detecting process.

Then, the arrangement position data n is referred to, and the information about the higher order attribute e having the arrangement plane of the attribute n is obtained (step S73 in FIG. 22). The definition information data n is referred to, and the height hn of the attribute n is obtained (step S74). The definition information data e is referred to, and the height he of the attribute e is obtained (step S75). Then, it is determined whether or not the arrangement plane of the attribute n is the same as that of the attribute e (step S76).

When the arrangement planes match each other, then hn−he is computed, and it is determined whether or not the result is 0 (step S77). If it is not 0, then it is assumed that the attributes n and e cannot be integrated into an attribute, the data table of the attribute n is output from the buffers 51, 52, and 53 to the files 41, 42, and 43 (step S78), and the processes in and after step S41 are performed.

If hn−he=0, then the attributes match each other at least in arrangement plane and height and there is a possibility that the attributes can be integrated into an attribute. Then, the vertex coordinate data n is referred to, and the sectional area An of the attribute n is computed (step S81). The vertex coordinate data e in the file 41 is referred to, the sectional area Ae of the attribute e is computed (step S82), and the An is compared with the Ae (step S83). In the case of the vertex coordinate data shown in FIG. 15, the sectional area can be computed using the X and Y coordinates of the coordinates in the { }.

If An<Ae, then it is assumed that the attribute n has the function of changing the sectional shape of the attribute e, the vertex coordinate data n are output to the amendment list 23 as additional information about the attribute e (step S84), and the data table of the attribute n is output to the deletion list 22 (step S85) Thus, for example, two attributes having the relationship as shown in FIG. 8 can be integrated into an attribute. Then, the data table of the attribute n is output from the buffers 51, 52, and 53 to the files 41, 42, and 43 (step S86), and the processes in and after step S41 are performed.

If An≧Ae, it is assumed that the attributes n and e offset each other, the data tables of the attributes n and e are output to the deletion list 22 (step S87), and the processes in and after step S86 are performed. Thus, for example, two attributes having the relationship as shown in FIG. 9 can be deleted.

If it is determined in step S76 that the arrangement planes do not match, then hn+he is computed, and it is determined whether or not the result is 0 (step S79) If hn+he is not 0, it is assumed that the attributes n and e cannot be integrated into an attribute, and the data table of the attribute n is output from the buffers 51, 52, and 53 to the files 41, 42, and 43 (step S80), and the processes in and after step S41 are performed.

If hn+he=0, then the attributes n and e touch on at least one face of the attribute e and have heights with the same absolute value and inverse signs, and there is a possibility that they can be integrated into an attribute. Then, the processes in and after step S81 are performed. If the attribute n refers to the final attribute in step S41 after repeating the above described processes, then the process terminates.

In the case of the solid model shown in FIG. 15, the data table of the attribute [1] is first read. However, it is the first generated base attribute, and is not a pattern attribute. Therefore, it is not detected as a redundant attribute, and is output as is to the files 41, 42, and 43. Next, the data tables of the attributes [2] and [3] are read. They are not detected as redundant attributes, and are output as is to the files 41, 42, and 43.

Then, the data table of the attribute [4] is read. Since the vertex coordinate data of the attribute [4] match the vertex coordinate data of the attribute [2], it is detected by the determination in step S45 shown in FIG. 19. The data tables of these attributes are output to the deletion list 22. The data table of the attribute [2] is also output to the files 41, 42, and 43. Next, the data table of the attribute [5] is read, but it is not detected as a redundant attribute, and is output as is to the files 41, 42, and 43.

Next, the data table of the attribute [6] is read. The attribute [6] is not detected as a redundant attribute in any of the processes shown in FIGS. 18, 19, and 20. Also in the determination in step S65 shown in FIG. 21, the attribute [6] does not match any higher order attribute in arrangement plane. Therefore, the information about the attribute [5] having the arrangement plane of the attribute [6] is obtained in step S73 shown in FIG. 22. In steps S74 and S75, the heights h of the attributes [5] and [6] are obtained.

Since these attributes do not match each other in arrangement plane, the obtained two heights h are added together in step S79, and it is checked whether or not the result of the addition is 0. Since the height h of the attribute [6] is 5 and the height h of the attribute [5] is −5, the result of the addition is 0.

Then, in steps S81 and S82, the sectional areas of the attributes [6] and [5] are computed. Since the sectional shape of the attribute [6] is a square each of which sides is 30 in length. Therefore, its area An is 900. The sectional shape of the attribute [5] is a square each of which sides is 50 in length. Therefore, its area Ae is 2,500. As a result, An<Ae in step S83.

In step S84, the vertex coordinate data of the attribute [6] being checked is output to the amendment list 23 as additional information about the higher order attribute [5], and the attribute [6] is integrated into the attribute [5]. Thus, the data table of the attribute [6] is not required, and therefore is output to the deletion list 22 in step S85. Thus, the deletion list and the amendment list as shown in FIGS. 16 and 17 are generated.

When a design model is applied to the structure analysis, etc., there arises no specific problem even if the arrangement reference representing the reference position for arrangement of each attribute is changed. In this case, the arrangement reference can be changed as necessary to reconstruct a model. In the example shown in FIG. 14, the arrangement reference of the attribute [3] includes the attribute [2]. Therefore, the attribute [2] cannot be deleted as is. However, by changing the arrangement reference, the attributes [2] and [4] can be simultaneously deleted, thereby furthermore compressing the data.

A new arrangement reference can be obtained by using an existing attribute which is not to be deleted, or by defining a pseudo-plane for use in operations. In FIG. 14, since the attribute [1], which is a base attribute, is not deleted, it can be used as an arrangement reference for the attribute [3].

In FIG. 14, when the XY plane, the YZ plane, and the ZX plane are used as pseudo-planes of the arrangement reference, these three planes are defined as the first three attributes. If the arrangement references of all subsequent attributes are set on these pseudo-planes, then the dependency between the attributes (parent-child relationship) can be completely released.

The structure optimization unit 14 regenerates the attributes in order of attribute numbers of the solid model data by performing the process shown in FIG. 13 by referring to the deletion list shown in FIG. 16 and the amendment list shown in FIG. 17. First, since the attribute [1] is not described in either list, it is regenerated as is. Since the attribute [2] is described in the deletion list, the data of the attribute are skipped and are not regenerated.

Next, since the attribute [3] is not described in either list, it is regenerated. However, since the attribute [2], which is an arrangement reference, has been deleted, the arrangement position cannot be set as is.

The operations unit 15 automatically computes the distance between the edge of the attribute [2], which is the arrangement reference of the attribute [3], and the edge of the existing attribute [1] using the arrangement position data and the vertex coordinate data of the attribute [2] in the deletion list. The structure optimization unit 14 changes the arrangement reference from the edge of the attribute [2] to the edge of the attribute [1]. At this time, the attribute number is changed from 3 to 2.

Then, the attribute [4] is described in the deletion list, and therefore is not regenerated. The attribute [5] is described in the amendment list, and cannot be regenerated as is. In this example, the additional vertex data described in the amendment list is added to the vertex coordinate data of the attribute [5], and the changed shape is regenerated. At this time, the attribute number is changed from 5 to 3.

Next, since the attribute [6] is described in the deletion list, it is not regenerated. Therefore, finally, the three attributes as shown in FIG. 23 remain. In FIG. 23, the attribute [1] corresponds to the original attribute [1], the attribute [2] corresponds to the original attribute [3] whose arrangement position has been amended, and the attribute [3] corresponds to the original attribute [5] whose vertex coordinates have been amended.

In this example, the arrangement reference of the attribute [3] is changed into the attribute [1] for regeneration. However, the above described work plane can be used as an arrangement reference. In this case, the operations unit 15 automatically defines three pseudo-work-planes based on the origin of the XYZ coordinate system, and automatically computes the distance between each of the work planes and the attribute [3]. The structure optimization unit 14 changes the arrangement reference of the attribute [3] into the work plane. For example, the XY plane, the YZ plane, and the ZX plane can be defined according to the simple information of Z=0, X=0, and Y=0 respectively.

Since three work planes are added as three pseudo-attributes in this method, a solid model data comprising six attributes is finally output. However, the attribute of a work plane does not require the vertex coordinate data, the arrangement position data, and the definition information data, and the amount of data is considerably small. Therefore, the amount of data of the regenerated solid model is much reduced.

Thus, a solid model data can be optimized by changing an arrangement reference. However, it is possible that an arrangement reference cannot be changed. For example, in processing a product using the numeric control processing device (NC machine), there arises a problem in the operation of the device when the arrangement reference is changed in case that a design model is applied in generating the NC data indicating the shape of a product.

In this case, it is desired that an auxiliary pseudo-curve having the same shape and arrangement as the attribute to be deleted is defined, the distance from the auxiliary curve is obtained, and a model is regenerated with the arrangement reference remaining unchanged. Since an attribute to be deleted is replaced with an auxiliary curve in this method, the data compression rate cannot be as high as in the above described regeneration example. However, since the amount of data of the auxiliary curve itself is small, the data can be compressed to some extent.

In this case, the structure optimization unit 14 regenerates a solid model data as follows by referring to the deletion list shown in FIG. 16 and the amendment list shown in FIG. 17. First, since the attribute [1] is not described in either list, it is regenerated as is. Since the attribute [2] is described in the deletion list, it is not regenerated.

Next, since the attribute [3] is not described in either list, it is to be regenerated. However, since the attribute [2], which is an arrangement reference, has been deleted, the arrangement position of the attribute [3] cannot be set as is.

The operations unit 15 automatically generates the auxiliary curve including the edge of the attribute [2], which is an arrangement reference of the attribute [3], using the arrangement position data and the vertex coordinate data of the attribute [2] in the deletion list. Then, the structure optimization unit 14 changes the arrangement reference from the edge of the attribute [2] to the auxiliary curve based on the computation result.

Figure 24:
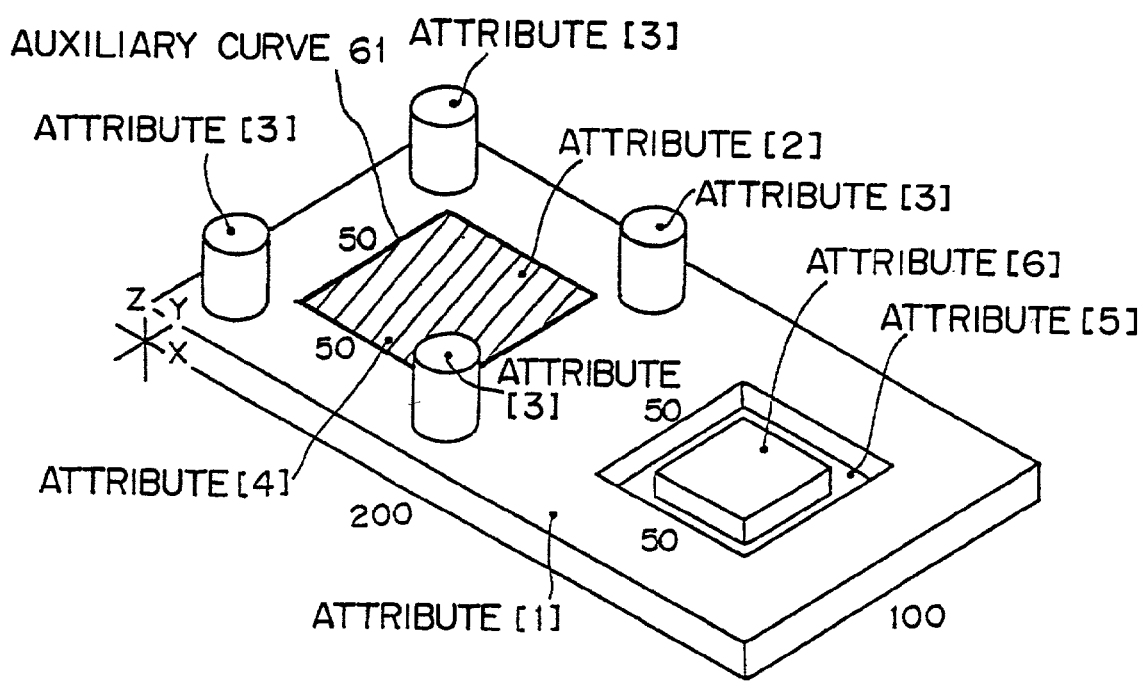
FIG. 24 shows the auxiliary curve.

Thus, an auxiliary curve 61 is generated as shown in FIG. 24, and the data table is set using the attribute number of the attribute [2] as shown in FIG. 25. When the data table shown in FIG. 25 is compared with the data table of the attribute [2] shown in FIG. 15, the number of pieces of the vertex coordinate data is reduced, and the definition information data is deleted as shown in FIG. 25. The auxiliary curve 61 holds necessary information as an arrangement reference of the attribute [3]. Therefore, the arrangement position data of the [3] is not changed.

Next, the attribute [4] is described in the deletion list, and therefore is not regenerated. The attribute [5] is described in the amendment list, and therefore cannot be regenerated as is. In this example, the additional vertex data described in the amendment list is added to the vertex coordinate data of the attribute [5], and a changed shape can be regenerated. At this time, the attribute number is changed from 5 to 4. Since the attribute [6] is described in the deletion list, it is not regenerated. Therefore, four attributes finally remain including the auxiliary curve 61.

According to the above described embodiment, a solid model is used as an example of a three-dimensional model. The present invention can also be applied to an arbitrary model such as a wire frame model, a surface model, etc. Furthermore, it is not always necessary to output a data table of an attribute to be deleted to the deletion list 22. That is, only the attribute number of the attribute to be deleted can be output.

Figure 26:
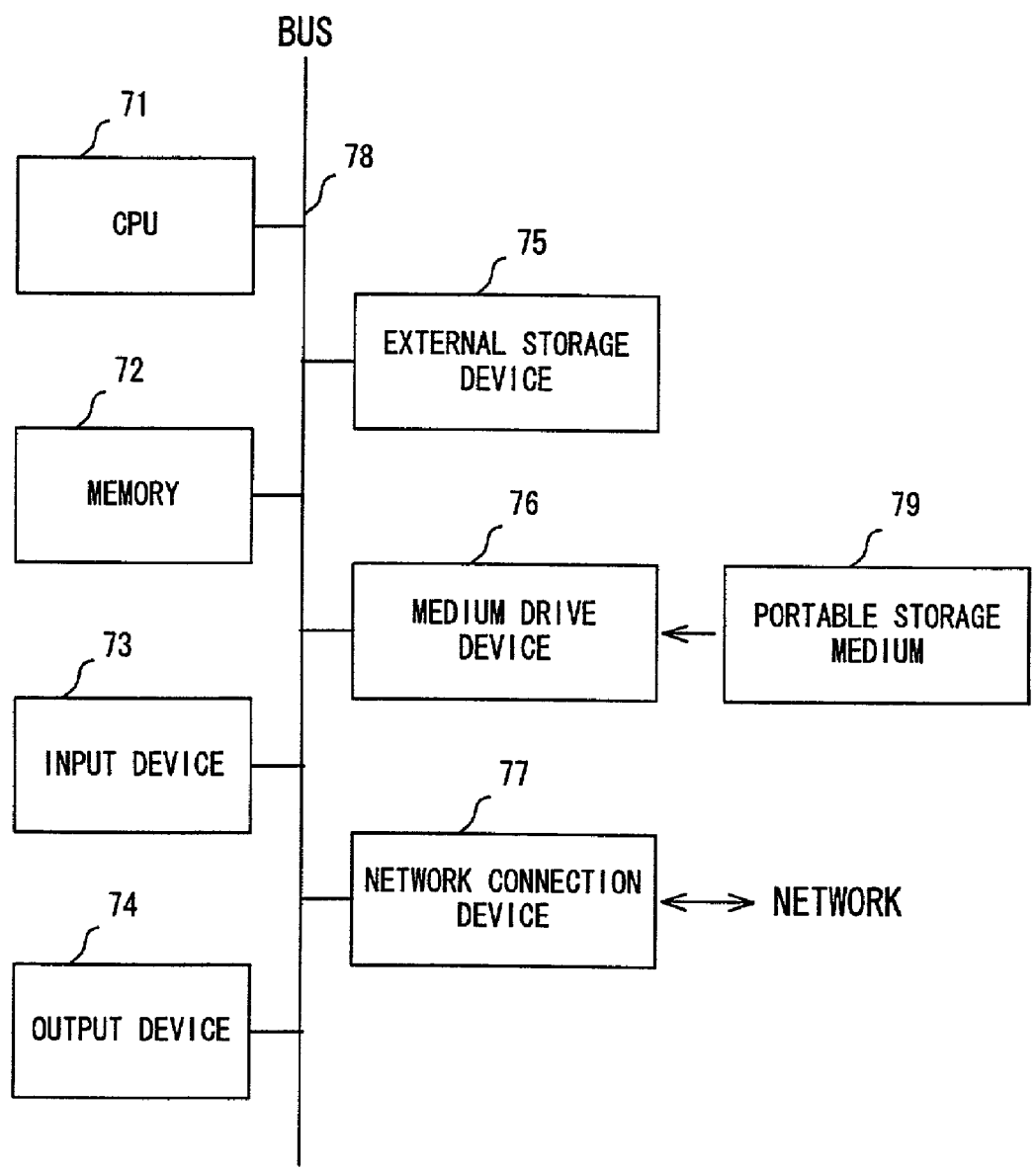
FIG. 26 shows the configuration of the information processing device.

The model optimization apparatus shown in FIG. 2 can be designed using the information processing device (computer) as shown in FIG. 26. The information processing device shown in FIG. 26 comprises a CPU (central processing unit) 71, memory 72, an input device 73, an output device 74, an external storage device 75, a medium drive device 76, and a network connection device 77. These units are interconnected through a bus 78.

The memory 72 comprises, for example, ROM (read-only memory), RAM (random access memory), etc., and stores a program and data used in the process. The CPU 71 performs a necessary process by executing a program using the memory 72.

The unnecessary attribute detection unit 12, the structure optimization unit 14, and the operations unit 15 shown in FIG. 2 correspond to software components described by the program, and are stored in a specific program code segment in the memory 72. The storage unit 13 shown in FIG. 2 corresponds to a specific storage area in the memory 72.

The input device 73 can be, for example, a keyboard, a pointing device, a touch panel, etc., and is used in inputting an instruction from a user and information. The output device 74 can be, for example, a display, a printer, etc., and is used in inquiring a user and outputting a process result, etc.

The external storage device 75 can be, for example, a magnetic disk device, an optical disk device, a magneto-optical disk device, etc. The external storage device 75 stores the above described program and data to use them by loading them in to the memory 72 as necessary. In addition, the external storage device 75 also functions as a database storing solid model data.

The medium drive device 76 drives a portable storage medium 79 and accesses the stored contents. The portable storage medium 79 can be an arbitrary computer-readable storage medium such as a memory card, a floppy disk, CD-ROM (compact disk read-only memo), an optical disk, a magneto-optical disk, etc. The portable storage medium 79 stores the above described program and data which can be loaded into the memory 72 as necessary.

The network connection device 77 communicates with an external device through an arbitrary network (line) such as the LAN (local area network), etc., and converts the data for use in the communications. In addition, the network connection device 77 can receive the above described program and data from an external device as necessary, load them into the memory 72 for use.

FIG. 27 shows computer-readable storage media capable of providing a program and data for the information processing device shown in FIG. 26. The program and data stored in the portable storage medium 79 and an external database 80 are loaded into the memory 72. The CPU 71 executes the program using the data, and performs necessary processes.

According to the present invention, a solid model which requires a small amount of data and has high flexibility for editing data can be automatically constructed. Thus, the resources such as a hard disk, etc. can be effectively utilized, and the display speed on a display unit can be improved. Since it has high editing flexibility, a model can be easily changed even if a new designer has been assigned or when a third party performs another operation using the model.

Furthermore, since a duplex attribute such as filling, etc. can be automatically deleted, a mesh division can be guaranteed while mesh data is prepared for analysis, and small shapes can be prevented from being generated. As a result, the work time required for an analyzing operation can be considerably shortened.

What is claimed is:

1. A model optimization apparatus, comprising:
   a detection unit detecting one or more redundant attributes from a plurality of attributes forming a three-dimensional model of an object by comparing attribute coordinates, and generating a list of attributes to be deleted and a list of attributes to be amended among the one or more redundant attributes responsive to the coordinate based comparison;
   a deletion unit deleting attribute information of attributes in the list of the attributes to be deleted, and amending attribute information of attributes in the list of the attributes to be amended; and
   a construction unit reconstructing a three-dimensional model of the object according to remaining attribute information including the amended attribute information and attribute information of attributes other than the one or more redundant attributes.

2. The apparatus according to claim 1, wherein:
   said detection unit detects an unnecessary attribute not contributing to an outline of the three-dimensional model from the plurality of attributes; and
   said deletion unit deletes the attribute information about the unnecessary attribute.

3. The apparatus according to claim 2, wherein: said detection unit detects two attributes having same outline information and offsetting each other; and said deletion unit deletes the two attributes.

4. The apparatus according to claim 2, wherein:
   said detection unit detects two attributes having different outline information and offsetting each other; and
   said deletion unit deletes the two attributes.

5. The apparatus according to claim 1, wherein:
   said detection unit detects two or more attributes which can be represented by one attribute from the plurality of attributes; and
   said deletion unit integrates attribute information of the two or more attributes into attribute information of the one attributes.

6. The apparatus according to claim 5, wherein:
   said detection unit detects two attributes having same sectional attribute information; and
   said deletion unit deletes attribute information of one of the two attributes, amends attribute information of the other attribute, and integrates attribute information of the two attributes into attribute information of one attribute.

7. The apparatus according to claim 5, wherein: said detection unit detects two attributes having same height information; and
   said deletion unit deletes attribute information of one of the two attributes, amends attribute information of the other attribute, and integrates attribute information of the two attributes into attribute information of one attribute.

8. The apparatus according to claim 5, wherein:
   said detection unit detects two or more attributes having a same arrangement plane information and same height information; and
   said deletion unit amends attribute information of one of the two or more attributes, deletes attribute information of other attributes, and integrates attribute information of the two or more attributes into attribute information of one attribute.

9. The apparatus according to claim 5, wherein: said detection unit detects two or more attributes defined as pattern attributes; and
   said deletion unit amends attribute information of one of the two or more attributes, deletes attribute information of other attributes, and integrates attribute information of the two or more attributes into attribute information of one attribute.

10. The apparatus according to claim 1, wherein:
said detection unit comprises:
a deletion target storage unit storing the list of the attributes to be deleted; and
an amendment target storage unit storing the list of the attributes to be amended.

11. The apparatus according to claim 10, wherein said deletion unit amends the attribute information of the attributes to be amended according to at least one of vertex coordinate information and height information included in deleted attribute information.

12. The apparatus according to claim 1, wherein said construction unit comprises a unit for amending arrangement reference information included in the remaining attribute information, and reconstructs the three-dimensional model according to the amended arrangement reference information.

13. The apparatus according to claim 1, wherein said construction unit comprises a unit for generating a pseudo attribute corresponding to arrangement reference information included in the remaining attribute information, and reconstructs the three-dimensional model using the pseudo attribute without amending the arrangement reference information.

14. A computer-readable storage medium storing a program used to direct a computer to perform:
detecting one or more redundant attributes from a plurality of attributes forming a three-dimensional model of an object by comparing attribute coordinates, and generating a list of attributes to be deleted and a list of attributes to be amended among the one or more redundant attributes responsive to the coordinate based comparison;
deleting attribute information of attributes in the list of the attributes to be deleted, and amending attribute information of attributes in the list of the attributes to be amended; and
reconstructing a three-dimensional model of the object according to remaining attribute information including the amended attribute information and attribute information of attributes other than the one or more redundant attributes.

15. A method of optimizing a model, comprising:
automatically detecting one or more redundant attributes from a plurality of attributes forming a three-dimensional model of an object by comparing attribute coordinates, and generating a list of attributes to be deleted and a list of attributes to be amended among the one or more redundant attributes responsive to the coordinate based comparison;
automatically deleting attribute information of attributes in the list of the attributes to be deleted, and amending attribute information of attributes in the list of the attributes to be amended; and
automatically reconstructing a three-dimensional model of the object according to remaining attribute information including the amended attribute information and attribute information of attributes other than the one or more redundant attributes.

16. A model optimization apparatus, comprising:
detection means for detecting one or more redundant attributes from a plurality of attributes forming a three-dimensional model of an object by comparing attribute coordinates, and generating a list of attributes to be deleted and a list of attributes to be amended among the one or more redundant attributes responsive to the coordinate based comparison;
deletion means for deleting attribute information of attributes in the list of the attributes to be deleted, and amending attribute information of attributes in the list of the attributes to be amended; and
construction means for reconstructing a three-dimensional model of the object according to remaining attribute information including the amended attribute information and attribute information of attributes other than the one or more redundant attributes.

* * * * *